US009256965B2

(12) United States Patent
Han

(10) Patent No.: US 9,256,965 B2
(45) Date of Patent: Feb. 9, 2016

(54) METHOD AND APPARATUS FOR GENERATING A DERIVED IMAGE USING IMAGES OF DIFFERENT TYPES

(71) Applicant: IMPAC Medical Systems, Inc., Sunnyvale, CA (US)

(72) Inventor: Xiao Han, Chesterfield, MO (US)

(73) Assignee: IMPAC MEDICAL SYSTEMS, INC., Sunnyvale, CA (US)

( * ) Notice: Subject to any disclaimer, the term of this patent is extended or adjusted under 35 U.S.C. 154(b) by 68 days.

(21) Appl. No.: 13/753,719

(22) Filed: Jan. 30, 2013

(65) Prior Publication Data

US 2014/0212013 A1 Jul. 31, 2014

(51) Int. Cl.
*G06T 11/00* (2006.01)
*G06T 7/00* (2006.01)

(52) U.S. Cl.
CPC ............... *G06T 11/003* (2013.01); *G06T 7/003* (2013.01); *G06T 2207/10081* (2013.01); *G06T 2207/10088* (2013.01); *G06T 2207/30004* (2013.01)

(58) Field of Classification Search
CPC ..................... G06T 7/003; G06T 2207/10081; G06T 11/003; G06T 2207/30004; G06T 2207/10088
See application file for complete search history.

(56) References Cited

U.S. PATENT DOCUMENTS

| | | | | |
|---|---|---|---|---|
| 5,351,006 A | * | 9/1994 | Sumanaweera et al. | 324/309 |
| 7,957,808 B2 | * | 6/2011 | Dawant et al. | 607/45 |
| 8,406,851 B2 | * | 3/2013 | West et al. | 600/411 |
| 8,774,481 B2 | * | 7/2014 | Schreibmann et al. | 382/131 |
| 8,811,701 B2 | * | 8/2014 | Khurd et al. | 382/128 |
| 8,818,057 B2 | * | 8/2014 | Bond et al. | 382/128 |
| 2006/0058641 A1 | * | 3/2006 | Krieg et al. | 600/416 |
| 2011/0007959 A1 | * | 1/2011 | Schulz et al. | 382/131 |
| 2011/0235884 A1 | * | 9/2011 | Schreibmann et al. | 382/131 |
| 2011/0286649 A1 | * | 11/2011 | Reisman et al. | 382/131 |
| 2012/0076378 A1 | * | 3/2012 | Keereman et al. | 382/131 |
| 2013/0135287 A1 | * | 5/2013 | McCabe et al. | 345/419 |
| 2013/0202177 A1 | * | 8/2013 | Bar-Aviv et al. | 382/131 |
| 2013/0308876 A1 | * | 11/2013 | Panter et al. | 382/284 |
| 2014/0140623 A1 | * | 5/2014 | Hamming et al. | 382/190 |

OTHER PUBLICATIONS

Image Registration and Fusion, Professor Michael Brady FRS FREng, Department of Engineering Science Oxford University.*

(Continued)

*Primary Examiner* — Bhavesh Mehta
*Assistant Examiner* — Pinalben Patel
(74) *Attorney, Agent, or Firm* — Finnegan, Henderson, Farabow, Garrett & Dunner, LLP

(57) ABSTRACT

Disclosed herein are techniques for translating a first image of a first type to a derived image of a second type. For example, a plurality of similarity indicators can be computed as between a plurality of patches of first image and a plurality of patches of a first atlas image, the first atlas image being of the first type. Weight factors can then be computed based on the computed similarity indicators. These weight factors can be applied to a plurality of data points of a second atlas image to compute a plurality of data points for the derived image such that each of at least a plurality of the data points for the derived image is a function of a plurality of the data points of the second atlas image. Such a technique can be used for pseudo-CT generation from an MR image.

32 Claims, 24 Drawing Sheets

(56) References Cited

OTHER PUBLICATIONS

MR-based PET Attenuation Correction—Method and Validation, M. Hofmann, F. Steinke, V. CHarpiat, Lab for Preclinical Imaging and Imaging Technology, Clinic of Radiology, University of Tubingenn, Germany, Max Planck Institute, Germany, WOlfson Medical Vision Lab, Oxford University, United Kingdom.*

Absorbed doses behined bones with MR image-based dose calculations for radiotherapy treatment planning, Juha Korhonen, Mila Kapanen, Clinical Research Inst. Helsinki University Central Hospital, Finland, published Dec. 7, 2012.*

Attenutation Correction Sysnthesis for Hybrid PET-MR Scanners: Application to Brain Studies, Ninon Burgos, M. Jorge Cadoso, IEEE Transactions on Medical Imaging; DOI10.1109/TMI.2014.2340135.*

Atlas based Segmentation and Classification of Magnetic Resonance Brain Images, These No. 2875, 2003,Ecole Polytechnique Federale De Lausanne, Lausanne, Meritxell Bach Cuadra, EPFL, 2003.*

Fusion of MRI and CT Images Using the Curvelet Transform, F.E. ALi, Department of Electronics and Electrical Communications, Faculty of Electronic Engineering, Menousfia University, 32952, Menouf, Egypet, Mar. 18-20, 2008, Faculty of Engineering, Tanta University, Egypt, 25$^{th}$ National Radio Science Conference (NRSC 2008).*

Szabo, Distributed High Dimensional Information Theoretical Image Registration via Random Projections, 2012 Elsevier Inc. Digital Signal Processing: 894-902, 2012.*

Sun, Fast Computing of Local Correlation Coefficients, Advanced signal processing algorithms, architectures, and implementations XVIII (Proceedings of SPIE), Society of Photo-Optical Instrumentation Engineers, Bellingham, USA (2008).*

Franccois Rousseau et al., A Supervised Patch-Based Approach for Human Brain Labeling, *IEEE Transactions on Medical Imaging*, Piscataway, NJ, USA, vol. 30, No. 10, pp. 1852-1862 (Oct. 2011).

Hofmann Matthias et al., MRI-Based Attenuation Correction for PET/MRI: A Novel Approach Combining Pattern Recognition and Atlas Registration, *J. Nuclear Medicine*, Reston, VA, USA, vol. 49, No. 11, pp. 1875-1883 (Nov. 2008).

Partial International Search Report, issued by the European Patent Office, corresponding to PCT/US2014/013535, date of mailing: Aug. 11, 2014, 7 pages.

International Search Report and Written Opinion, issued by the European Patent Office in corresponding Application No. PCT/US2014/013535, mailed Nov. 26, 2014, 17 pages.

* cited by examiner

Comparison between Patch 502 and
Patch 602 yields Score$_1$ for Xi

Comparison between Patch 502 and
Patch 604 yields Score$_2$ for Xi

Comparison between Patch 502 and
Patch 606 yields Score₃ for Xi

Comparison between Patch 502 and
Patch 608 yields Score$_4$ for Xi

Comparison between Patch 502 and
Patch 614 yields Score$_7$ for Xi

Comparison between Patch 502 and
Patch 618 yields $Score_9$ for Xi

Data Relationships for Point Xi of the Patient MR Image

| Scores | Corresponding Atlas MR Point (700) | Corresponding Atlas CT Value (702) |
|---|---|---|
| Score 1 | X'i | Y'(X'i) |
| Score 2 | N'1 | Y'(N'1) |
| Score 3 | N'2 | Y'(N'2) |
| Score 4 | N'3 | Y'(N'3) |
| Score 5 | N'4 | Y'(N'4) |
| Score 6 | N'5 | Y'(N'5) |
| Score 7 | N'6 | Y'(N'6) |
| Score 8 | N'7 | Y'(N'7) |
| Score 9 | N'8 | Y'(N'8) |

Figure 7

Data Relationships for Point Xi of the Patient MR Image

| Scores | Corresponding Atlas MR Point (700) | Corresponding Atlas CT Value (702) | Weights (800) |
|---|---|---|---|
| Score 1 | X'i | Y'(X'i) | W(X'i) |
| Score 2 | N'1 | Y'(N'1) | W(N'1) |
| Score 3 | N'2 | Y'(N'2) | W(N'2) |
| Score 4 | N'3 | Y'(N'3) | W(N'3) |
| Score 5 | N'4 | Y'(N'4) | W(N'4) |
| Score 6 | N'5 | Y'(N'5) | W(N'5) |
| Score 7 | N'6 | Y'(N'6) | W(N'6) |
| Score 8 | N'7 | Y'(N'7) | W(N'7) |
| Score 9 | N'8 | Y'(N'8) | W(N'8) |

Figure 8

Data Relationships for Point Xi of the Patient MR Image

| Scores | Corresponding Atlas MR Point (700) | Corresponding Atlas CT Value (702) | Weights (800) |
|---|---|---|---|
| Score 1 | X'i | Y'(X'i) | W(X'i) |
| Score 2 | N'1 | Y'(N'1) | W(N'1) |
| Score 3 | N'2 | Y'(N'2) | W(N'2) |
| Score 4 | N'3 | Y'(N'3) | W(N'3) |
| Score 5 | N'4 | Y'(N'4) | W(N'4) |
| Score 6 | N'5 | Y'(N'5) | W(N'5) |
| Score 7 | N'6 | Y'(N'6) | W(N'6) |
| Score 8 | N'7 | Y'(N'7) | W(N'7) |
| Score 9 | N'8 | Y'(N'8) | W(N'8) |

Figure 9    Use these values to compute a derived CT value for Xi, Z(Xi)

Data Relationships for Point Xi of the Patient MR Image

| Scores | Corresponding Atlas MR Point (700) | Corresponding Atlas CT Value (702) | Weights (800) |
|---|---|---|---|
| Score 1 (Atlas 1) | $X'i_{Atlas1}$ | $Y'(X'i_{Atlas1})$ | $W(X'i_{Atlas1})$ |
| Score 2 (Atlas 1) | $N'1_{Atlas1}$ | $Y'(N'1_{Atlas1})$ | $W(N'1_{Atlas1})$ |
| ⋮ | | | |
| Score M (Atlas 1) | $N'M_{Atlas1}$ | $Y'(N'M_{Atlas1})$ | $W(N'M_{Atlas1})$ |
| Score 1 (Atlas 2) | $X'i_{Atlas2}$ | $Y'(X'i_{Atlas2})$ | $W(X'i_{Atlas2})$ |
| Score 2 (Atlas 2) | $N'1_{Atlas2}$ | $Y'(N'1_{Atlas2})$ | $W(N'1_{Atlas2})$ |
| ⋮ | | | |
| Score M (Atlas 2) | $N'M_{Atlas2}$ | $Y'(N'M_{Atlas2})$ | $W(N'M_{Atlas2})$ |
| ⋮ | | | |
| Score 1 (Atlas Q) | $X'i_{AtlasQ}$ | $Y'(X'i_{AtlasQ})$ | $W(X'i_{AtlasQ})$ |
| Score 2 (Atlas Q) | $N'1_{AtlasQ}$ | $Y'(N'1_{AtlasQ})$ | $W(N'1_{AtlasQ})$ |
| ⋮ | | | |
| Score M (Atlas Q) | $N'M_{AtlasQ}$ | $Y'(N'M_{AtlasQ})$ | $W(N'M_{AtlasQ})$ |

Figure 10(b)

Data Relationships for Point Xi of the Patient MR Image

| Sorted Scores | Corresponding Atlas MR Point | Corresponding Atlas CT Value | Weights |
|---|---|---|---|
| Score 3 | N'2 | Y'(N'2) | W(N'2) |
| Score 1 | X'i | Y'(X'i) | W(X'i) |
| Score 4 | N'3 | Y'(N'3) | W(N'3) |
| Score 5 | N'4 | Y'(N'4) | W(N'4) |
| Score 8 | N'7 | Y'(N'7) | W(N'7) |
| Score 2 | N'1 | Y'(N'1) | |
| Score 7 | N'6 | Y'(N'6) | |
| Score 9 | N'8 | Y'(N'8) | |
| Score 6 | N'5 | Y'(N'5) | | k=5

Only use the top k scores to compute the weights, and then compute CT value for Xi from those weights

Figure 11

Comparison between Patch 1502 and Patch 1602 yields one score for Y'i

METHOD AND APPARATUS FOR GENERATING A DERIVED IMAGE USING IMAGES OF DIFFERENT TYPES

INTRODUCTION

There is a need in the art for an effective technique to process a first image of a first type to automatically derive from the first image a derived image of a second type. For example, it is highly desirable to transform a new patient image where the image type/modality is magnetic resonance (MR) into a corresponding derived image where the image type/modality is computed tomography (CT). Such a transformation can be characterized as "pseudo-CT generation". Because the CT data contained by the data points of a CT image are indicative of different patient characteristics than the MR data contained by the data points of an MR image, it is often very useful for medical personnel to assess both the MR characteristics and CT characteristics of a region of interest in a patient to decide upon an optimal treatment or diagnosis. The derived CT image can also be used to facilitate patient dose computation in radiotherapy treatment planning. By accurately generating a pseudo-CT image from an MR image, patients can be spared from the additional radiation exposure that arises due to CT imaging as well as the time and expense of undergoing additional CT imaging.

To facilitate such derivation, atlas images can be employed. An atlas image is a pre-existing image that is used as a reference to facilitate how the new image is to be translated to generate the derived image. For example, in the pseudo-CT generation context, an atlas MR image and an atlas CT image can be used as references for generating a derived CT image from the new patient MR image. It is common that the atlas images will be previously generated images of the same region of interest for the same patient who is the subject of the new MR image, where these atlas images have already been analyzed to identify structures of interest. For example, in many treatment or diagnostic situations, the patient will need to be subjected to imaging at several different times over the course of the treatment/diagnosis. However, this need not be the case—for example, the atlas images need not be images of the same person.

The atlas MR image and the atlas CT image are preferably aligned with each other via a registration technique (such an atlas MR image and atlas CT image are said to be "registered" with each other, or in "registration"). With such registration, a given point in the atlas MR image for a particular location of the subject will be mapped to a given point in the atlas CT image for the same particular location (and vice versa). However, it should be understood that it is expected that some amount of error will be present in this registration. As such, the registration between the atlas MR image and the atlas CT image will not be perfect.

For example, in an idealized hypothetical situation where no errors exist in the atlas MR image-to-atlas CT image registration, and where the new patient MR image could be perfectly registered with the atlas MR image, then it would follow that one could simply derive the patient CT image from the patient MR image by mapping each point in the patient MR image to a corresponding point in the registered atlas MR image, then mapping that point in the atlas MR image to its corresponding point in the registered atlas CT image. The relationship between the CT information for this mapped data point in the atlas CT image and the MR image for the mapped data point in the atlas MR image can then be used in combination with the MR information for the data point in the patient MR image to compute a data point for derived CT image. However, because such a simplified transformation technique does not account for the error tolerances that exist with respect to image registration (both in the patient-to-atlas registration and the atlas-to-atlas registration), the inventor believes that there is room for improvement in the art.

Toward this end, the inventor discloses a method of converting a first image of a first type to a derived image of a second type based on a second image and a third image, the second image being of the first type, the third image being of the second type, the second and third images being in registration with each other, the first image comprising a plurality of data points, each first image data point comprising first type data for the first image, the second image comprising a plurality of data points, each second image data point comprising first type data for the second image, the third image comprising a plurality of data points, each third image data point comprising second type data for the third image, the method comprising: (1) performing a plurality of comparisons between a patch of the first image and a plurality of patches of the second image to generate a plurality of similarity indicators, the similarity indicators being indicative of similarities as between a first image data point and a plurality of second image data points, (2) computing a plurality of weight factors based on the similarity indicators, the computed weight factors being associated with a plurality of third image data points, (3) computing a derived image data point corresponding to the first image data point as a weighted combination of the third image data points that are associated with the computed weight factors, the weighted combination being in accordance with the computed weight factors, and (4) repeating the comparisons performing step, the weight factors computing step, and the derived image data point computing step for a plurality of different first image data points to thereby generate the derived image from the plurality of computed derived image data points, and wherein the method steps are performed by a processor.

It should be understood that the term "patch" with respect to an image as used herein refers to a subset of the data points for that image. Thus, by comparing patches of the first image with patches of the second image, a greater pool of data points are considered to assess how well a given data point of the first image maps to a given point of the second image. The power of such patch comparison-based weighted combination is that it better accommodates the existence of error in image registration. That is, patch comparison-based weighted combination is expected to be robust to image registration error because it allows for pooling information from a larger portion of the images.

The inventor further discloses an apparatus for converting a first image of a first type to a derived image of a second type based on a second image and a third image, the second image being of the first type, the third image being of the second type, the second and third images being in registration with each other, the first image comprising a plurality of data points, each first image data point comprising first type data for the first image, the second image comprising a plurality of data points, each second image data point comprising first type data for the second image, the third image comprising a plurality of data points, each third image data point comprising second type data for the third image, the apparatus comprising a processor configured to (1) perform a plurality of comparisons between a patch of the first image and a plurality of patches of the second image to generate a plurality of similarity indicators, the similarity indicators being indicative of similarities as between a first image data point and a plurality of second image data points, (2) compute a plurality of weight factors based on the similarity indicators, the computed weight factors being associated with a plurality of third image data points, (3) compute a derived image data point corresponding to the first image data point as a weighted combination of the third image data points that are associated with the computed weight factors, the weighted combination being in accordance with the computed weight factors, (4) repeat the comparisons operation, the weight factors computation operation, and the derived image data point computation operation for a plurality of different first image data points to thereby generate the derived image from the plurality of computed derived image data points.

Further still, disclosed herein is a computer program product for converting a first image of a first type to a derived image of a second type based on a second image and a third image, the second image being of the first type, the third image being of the second type, the second and third images being in registration with each other, the first image comprising a plurality of data points, each first image data point comprising first type data for the first image, the second image comprising a plurality of data points, each second image data point comprising first type data for the second image, the third image comprising a plurality of data points, each third image data point comprising second type data for the third image, the computer program product comprising a plurality of instructions that are resident on a non-transitory computer-readable storage medium and executable by a processor to (1) perform a plurality of comparisons between a patch of the first image and a plurality of patches of the second image to generate a plurality of similarity indicators, the similarity indicators being indicative of similarities as between a first image data point and a plurality of second image data points, (2) compute a plurality of weight factors based on the similarity indicators, the computed weight factors being associated with a plurality of third image data points, (3) compute a derived image data point corresponding to the first image data point as a weighted combination of the third image data points that are associated with the computed weight factors, the weighted combination being in accordance with the computed weight factors, (4) repeat the comparisons operation, the weight factors computation operation, and the derived image data point computation operation for a plurality of different first image data points to thereby generate the derived image from the plurality of computed derived image data points.

In accordance with another embodiment, the inventor discloses a technique for translating a first image of a first type to a derived image of a second type whereby a plurality of similarity indicators are computed as between a plurality of patches of first image and a plurality of patches of a first atlas image, the first atlas image being of the first type. Weight factors can then be computed based on the computed similarity indicators. These weight factors can be applied to a plurality of data points of a second atlas image to compute a plurality of data points for the derived image such that each of at least a plurality of the data points for the derived image is a function of a plurality of the data points of the second atlas image. Such a technique can be used for pseudo-CT generation from an MR image.

In accordance with yet another embodiment, the inventor discloses a technique for translating a first atlas image of a first type to a derived atlas image of a second type whereby a plurality of similarity indicators are computed as between a plurality of patches of first atlas image and a plurality of patches of a second atlas image, the first atlas image being of the first type and the second atlas image being of the second type. Weight factors can then be computed based on the computed similarity indicators. These weight factors can be applied to a plurality of data points of a second atlas image to compute a plurality of data points for the derived atlas image such that each of at least a plurality of the data points for the derived atlas image is a function of a plurality of the data points of the second atlas image.

These and other features and advantages of the present invention will be apparent to those having ordinary skill in the art upon review of the teachings in the following description and drawings.

BRIEF DESCRIPTION OF THE DRAWINGS

FIG. 7 depicts an exemplary data structure showing how similarity scores from the patch comparisons for a given point Xi of a patient MR image can be associated with points of an atlas MR image and an atlas CT image.

FIG. 8 depicts the exemplary data structure of FIG. 7 augmented with computed weight factors for the various atlas image points.

FIG. 9 identifies how a derived CT value for point Xi of the patient MR image can be computed from the data structure of FIG. 8.

FIG. 10(b) depicts an exemplary data structure showing how similarity scores from the patch comparisons for a given point Xi of a patient MR image can be associated with points of the multiple atlases of FIG. 10(a).

FIG. 11 depicts an exemplary embodiment where a subset of the similarity scores can be used to compute the weight factors.

DETAILED DESCRIPTION

Figure 1:
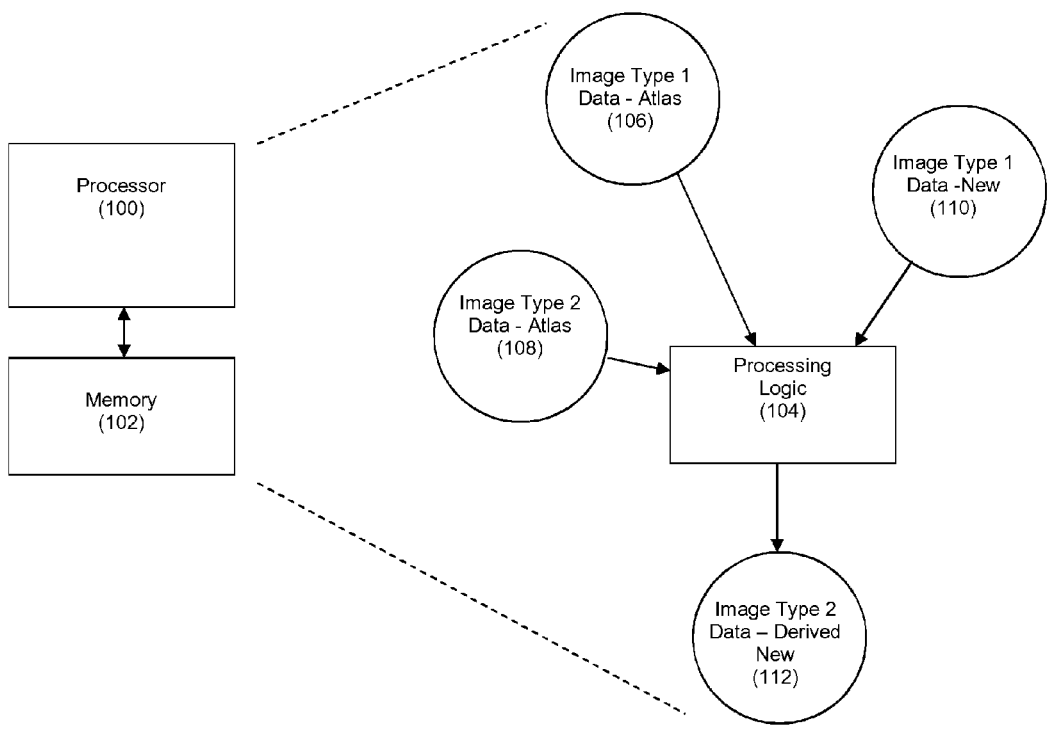
FIG. 1 depicts an exemplary embodiment of the invention.

FIG. 1 depicts an exemplary embodiment for the invention. As shown in FIG. 1, a processor 100 can be configured to implement processing logic 104 whereby a first image 110 of a first type (Type 1) is converted to a derived image 112 of a second type (Type 2) using an atlas image 106 (Type 1) and an atlas image 108 (Type 2). It should be understood that the images can be either two-dimensional (2D) images or three-dimensional (3D) images. With a 2D image, the image data points can be referred to as pixels. With a 3D image, the image data points can be referred to as voxels.

The processor 100 can be any processor with sufficient computational capabilities to implement the features described herein. It should be understood that processor 100 may comprise multiple processors, optionally distributed via a network. The programming instructions for implementing the processing logic 104 can be resident on a non-transitory computer-readable storage medium (e.g., memory 102) for access and execution by the processor 100. It should be understood that the memory 102 may comprise multiple memory devices, optionally multiple distributed memory devices and/or memory devices of different types.

Figure 2:
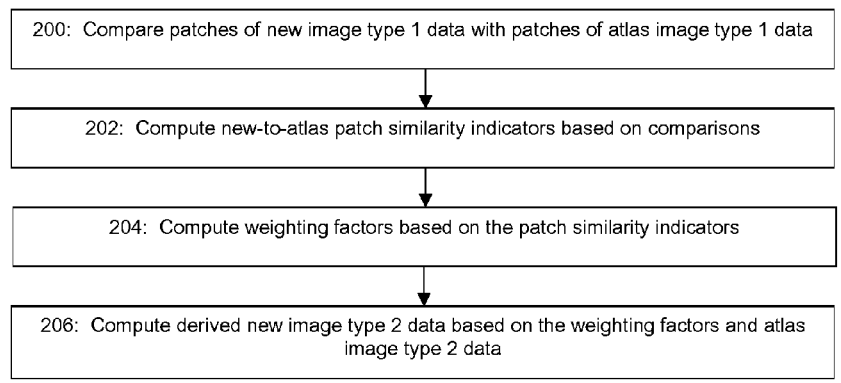
FIG. 2 depicts an exemplary process flow for execution by a processor in accordance with an exemplary embodiment.

FIG. 2 depicts an exemplary process flow for the processing logic 104. At step 200, the processor compares patches of the new image 110 with patches of the type 1 atlas image 106. At step 202, the processor computes a plurality of similarity indicators based on these patch comparisons. Each similarity indicator can be indicative of how similar a given patch of new image 110 is with respect to a given patch of type 1 atlas image 106. From these similarity indicators, the processor can compute weight factors (step 204). These weight factors can govern how much influence a given data point of the type 2 atlas image will have on the computation of a new data point for the derived type 2 image 112. At step 206, the processor computes the derived type 2 image 112 data based on the weight factors in combination with data from the atlas type 2 image 108.

Figure 3:
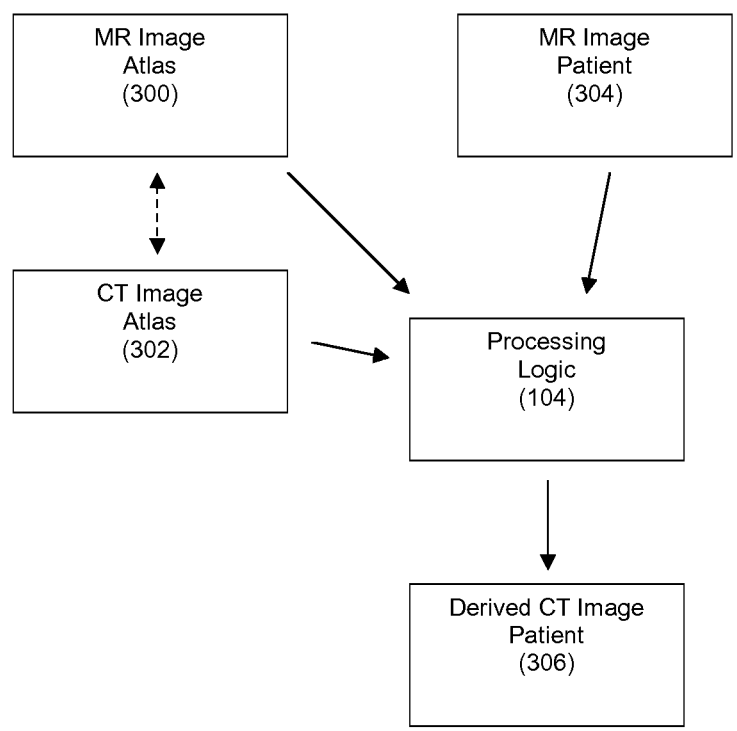
FIG. 3 depicts an exemplary pseudo-CT generation embodiment.

FIG. 3 depicts an exemplary embodiment where the processing logic 104 is configured to perform pseudo-CT generation. Thus, with reference to the exemplary embodiment of FIG. 1, the type 1 imaging modality can be magnetic resonance (MR) and the type 2 imaging modality can be computed tomography (CT). Thus, with the FIG. 3 embodiment, the image to be transformed is a patient MR image 304. The atlas images will be an atlas MR image 300 and an atlas CT image 302. These atlas images 300 and 302 are preferably in registration with each other. In FIG. 3, the processing logic 104 will operate on these images 300, 302, and 304 to generate the derived patient CT image 306. While embodiments described herein employ pseudo-CT generation from an MR image, it should be understood that other imaging types/modalities could be employed. For example, a practitioner may employ techniques described herein to derive an ultrasound image from an MR or CT image.

Figure 4:
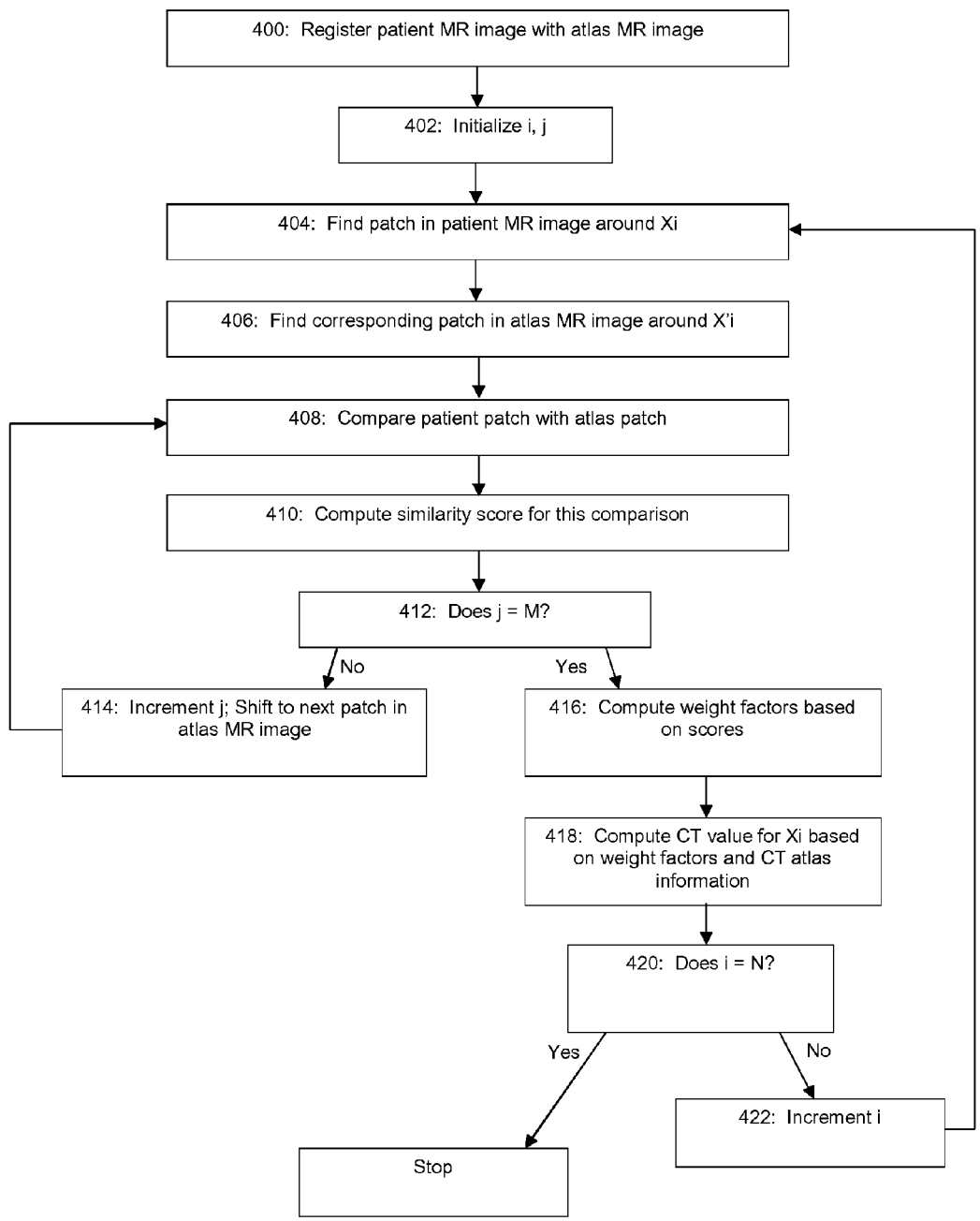
FIG. 4 depicts an exemplary embodiment for the process flow of FIG. 2.

FIG. 4 depicts an exemplary process flow for the processing logic 104 of FIG. 3. At step 400, the patient MR image 304 is registered with the atlas MR image 300. Any of a number of registration techniques can be used. For example, deformable registration (DIR) can be employed. Additional examples of image registration techniques that can be employed are described by Andersson et al., "*Evaluation of 14 nonlinear deformation algorithms applied to human brain MRI registration*", Neuroimage 46: 786-802, 2009, the entire disclosure of which is incorporated herein by reference. As still additional examples, the image registration techniques described by Avants, et al., "*Symmetric diffeomorphic image registration with cross-correlation: evaluating automated labeling of elderly and neurogenerative brain*", Med. Image Anal. 12, 26-41, 2008, and Liao et al., "Feature based non-rigid brain MR image registration with symmetric alpha stable filters", IEEE Trans. Med. Imag., 29(1): 106-119, 2010, the entire disclosures of each of which are incorporated herein by reference, can be employed. As a result of this registration process, each data point $X_i$ of the patient MR image 300 will have a corresponding data point $X_i'$ of the atlas MR image.

At step 402, the processor initializes the variables i and j. The variable i will be used to identify the data points of the patient MR image 304. The variable j will be used to govern how many patch comparisons are performed with respect to a given point $X_i$ of the patient MR image 304.

Figure 5:
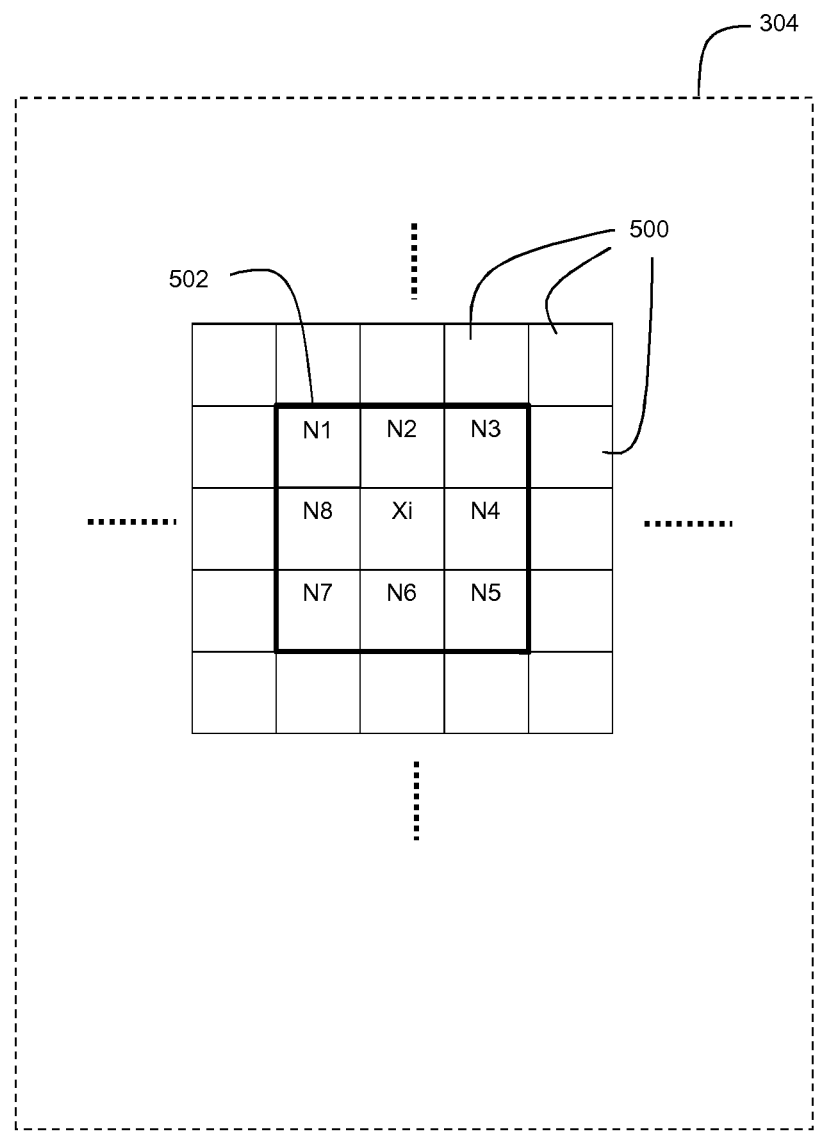
FIG. 5 depicts an exemplary patch for a patient MR image.

At step 404, the processor selects a patch in the patient MR image 304 with respect to data point $X_i$ of the patient MR image 304. The selected patient MR image patch can be a neighborhood of data points from the patient MR image 304 near $X_i$. For example, with reference to the example of FIG. 5, for a patient MR image 304 that comprises a plurality of data points 500, the selected patient MR image patch 502 can be a plurality of data points $N_1, N_2, \ldots$ surrounding $X_i$. It should be understood that the size and shape of patch 502 as shown by FIG. 5 is exemplary only. A practitioner can define a desired size and/or shape for the patch 502. For example, as the patch size becomes smaller, the reliability of the similarity comparison can be reduced as small patch sizes become more sensitive to image noise. By contrast, as the patch size becomes larger, then reliability can be degraded because the similarity comparison becomes less sensitive to voxel or pixel differences. Large patch sizes can also negatively impact latency as comparisons can take longer to compute. Thus, a practitioner should select an appropriate patch size for the situation in view of such considerations. Typically, the patch shape defines a local region centered at the voxel (or pixel) under consideration. As for shape, a box or sphere shape is desirable as an efficient choice for implementation (e.g., the box could be simply specified by its side-length, and a sphere could be simply specified by its radius).

At step 406, the processor selects a patch in the atlas MR image 300 with respect to data point $X_i'$ of the atlas MR image 300. It will be recalled that data point $X_i'$ is the atlas MR image data point that corresponds to data point $X_i$ of the patient MR image as a result of the registration at step 400. The selected atlas MR image patch can be a neighborhood of data points from the atlas MR image 300 near $X_i'$. For example, with reference to the example of FIG. 6(a), for an atlas MR image 300 that comprises a plurality of data points 600, the selected atlas MR image patch 602 can be a plurality of data points $N_1', N_2', \ldots$ surrounding $X_i'$. As with FIG. 5, it should be understood that the size and shape of patch 602 as shown by FIG. 6 is exemplary only. A practitioner can define a desired size and/or shape for the patch 602. Preferably, the size and shape of patch 602 matches that of patch 502.

At step 408, the selected patient MR image patch (see patch 502) is compared with the selected atlas MR image patch (see patch 602). This comparison results in the computation of a similarity indicator such as a similarity score (step 410; see also FIG. 6(a)). Any of a number of techniques can be used to compare patch 502 with patch 602 to assess and quantify similarity.

For example, the patches 502 and 602 can be directly compared using various techniques. As an example, a sum-of-squared-intensity differences (SSD) technique can be applied to the intensity data present in the data points of patches 502 and 602 to quantify their similarity. However, the inventor has found that a more useful direct comparison technique is a local correlation coefficient (LCC) comparison technique. The LCC comparison technique can compute a similarity score (LCC) in accordance with the following formula:

$$LCC(x; S, A_i) = \frac{\sum_{y \in B(x)} (S(y) - \overline{S})(A_i(y) - \overline{A}_i)}{\sqrt{\sum_{y \in B(x)} (S(y) - \overline{S})^2 \sum_{y \in B(x)} (A_i(y) - \overline{A}_i)^2}}$$

In this formula:
S denotes the patient MR image
$A_i$ denotes the atlas MR image
x denotes that point $X_i$ under consideration
B(x) denotes the patch of points centered at point $X_i$. The same patch size and shape will be used for the patient MR image and the atlas MR image.
$\overline{S}$ denotes the local mean of S inside B(x), where $\overline{S}$ can be computed as:

$$\overline{S} = \frac{1}{\#B(x)} \sum_{y \in B(x)} S(y)$$

$\overline{A}_i$ denotes the local mean of $\overline{A}_i$ inside B(x), where $\overline{A}_i$ can be computed as:

$$\overline{A}_i = \frac{1}{\#B(x)} \sum_{y \in B(x)} A_i(y)$$

The LCC score in such an embodiment will exhibit values in the range of [−1,1]. Furthermore, it should be understood that the #B(x) notation refers to the number of points in B.

As another example, the patches 502 and 602 can be indirectly compared using feature vector data derived from the patches 502 and 602, examples of which are explained below with reference to FIGS. 17 and 18.

Further still, patch comparison can be performed using a random projections technique. Random projection is a method for dimensionality reduction. The motivation for using random projections to implement patch comparisons is to improve computation speed. The patches are signals, and computing their similarity (or, equivalent, computing the distance between them, large distance means low similarity) is slow if the dimension or length of the signal is large (i.e., if patch size is large). As described in the paper Bingham, et al., "*Random projection in dimensionality reduction: applications to image and text data*", Knowledge Discovery and Data Mining, pages 245-250, 2001 (the entire disclosure of which is incorporated herein by reference), random projections have emerged as a powerful method for dimensionality reduction. In random projection (RP), the original high-dimensional data is projected onto a lower-dimensional subspace using a random matrix whose columns have unit lengths. RP has been found to be a computationally efficient, yet sufficiently accurate method for dimensionality reduction of high-dimensional data sets. Thus, when applying RP to patch comparisons, the patches can be projected to a lower-dimensional subspace, and the similarity assessment can then be performed in such a subspace.

Thus, the conclusion of step 410 will yield a similarity score that is indicative of the similarity between patch 502 and patch 602.

At step 412, the processor checks whether j equals M. M is a parameter chosen by a practitioner to define how many different patch comparisons are performed with respect to patch 502. In an extreme case, M can be 1, although this would be more susceptible to the carrying forward of registration error as between the atlas MR image and the atlas CT image. As such, it is preferred that a larger value for M be used to further pool the consideration of more data points. The value for M can be determined by the size of a searching region. Similar to the patches, the searching region can be defined as a box or a sphere centered around a point of interest (typically, this will be the point of the atlas MR image that is registered with the point under consideration in the patient MR image), and if M is greater than 1, the size of this searching region will be greater than the patch size. The choice for how large of a searching region to choose can be a function of how reliable a practitioner believes the image registrations to be. For example, if the registration between the patient MR image and the atlas MR image is believed to include a fair amount of registration error, this would indicate that a larger searching region should be used. For an extreme at the other end, M can be a value large enough so that patch 502 is effectively compared with patches encompassing the entire atlas MR image. However, it is believed that such a large value for M is less desirable than a value between the extremes because if the value for M is too large, not only will computation time be slowed, but the likelihood of finding false positive similarities is expected to increase. If j does not yet equal M, the process flow proceeds to step 414.

Figure 6A:
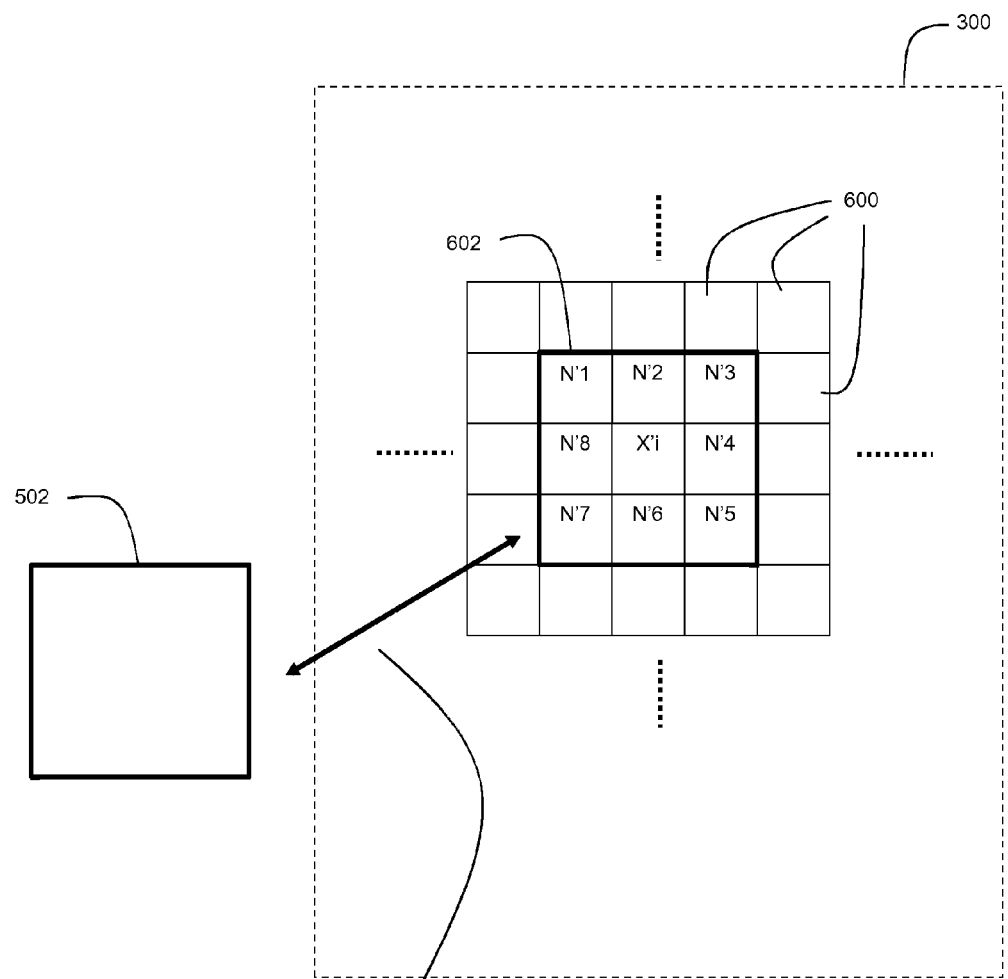
FIGS. 6(a)-(i) depict examples of how the exemplary patient MR image patch can be compared with various exemplary patches of an atlas MR image.
Figure 6B:
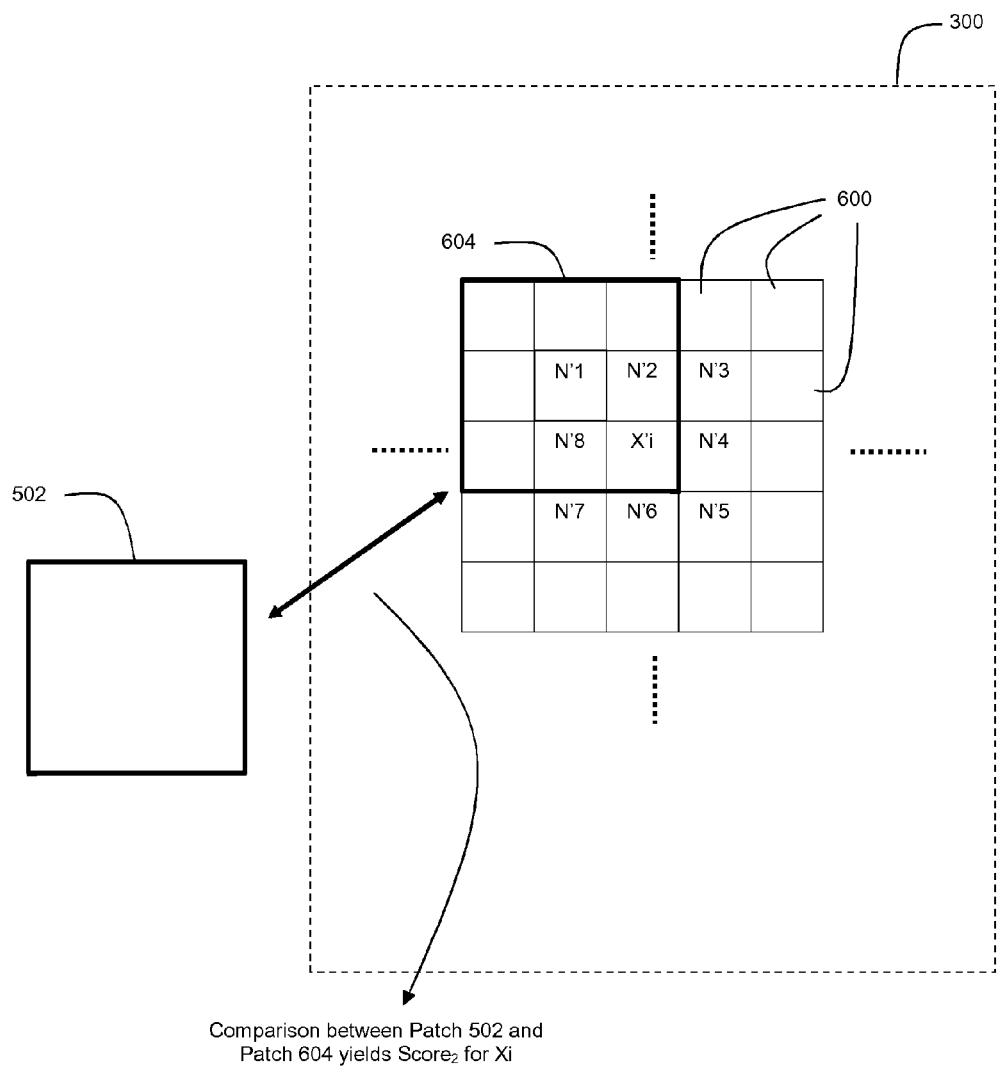

At step 414, the processor increments j which is effective to shift to the next patch in the atlas MR image. This next patch is a patch of the atlas MR image 300 around a different atlas MR image data point. For example, FIG. 6(b) shows an example where the next patch in the atlas MR image is patch 604 centered around point $N_1'$. Point $N_1'$ can then be characterized as the data point of atlas MR image that corresponds to patch 604. As can be seen, patch 604 encompasses a different set of data points 600 of the atlas MR image 300 that are near point $X_i'$. To shift from atlas patch to atlas patch, the process flow can select various points in the searching region as the point around which the atlas patch is centered. It is preferred that all points in the searching region be used as the center points for an atlas patch, although this need not be the case.

Figure 6C:
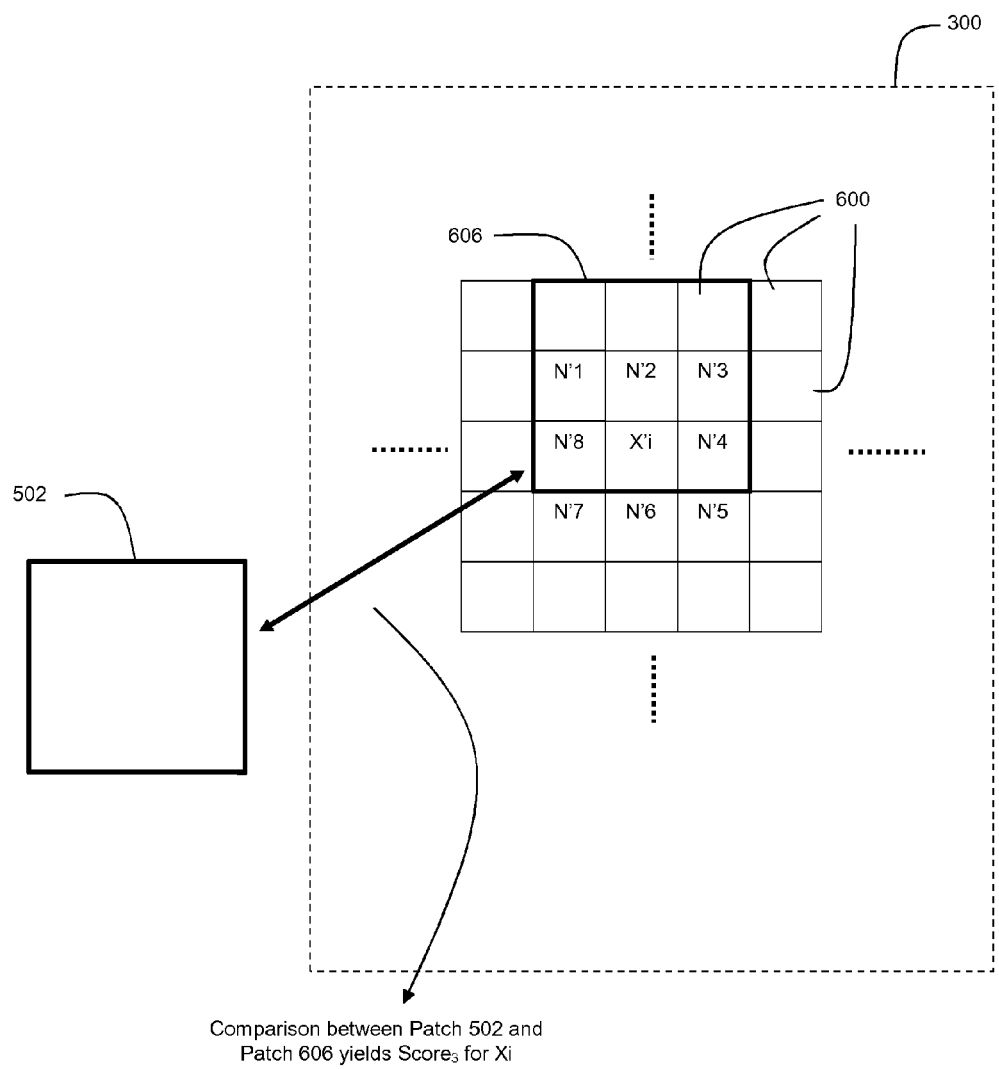
Figure 6D:
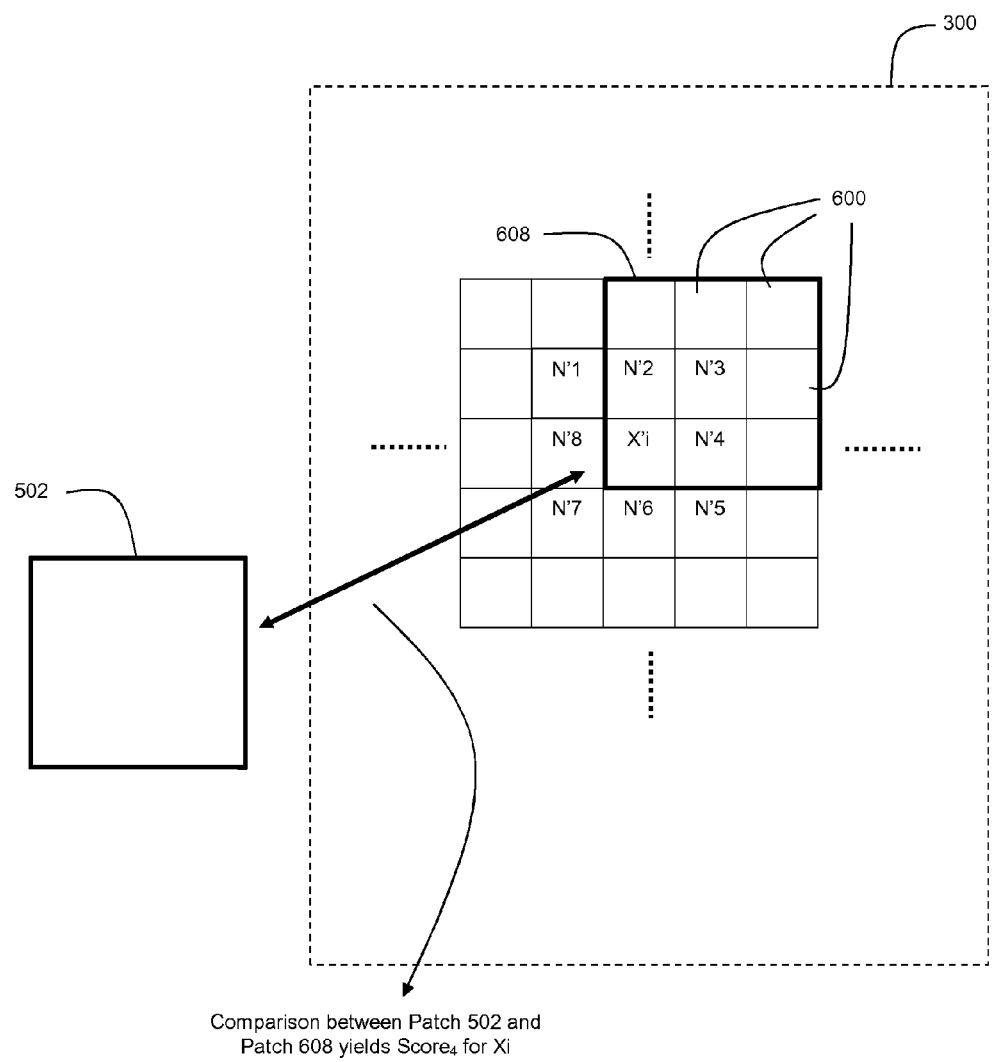
Figure 6E:
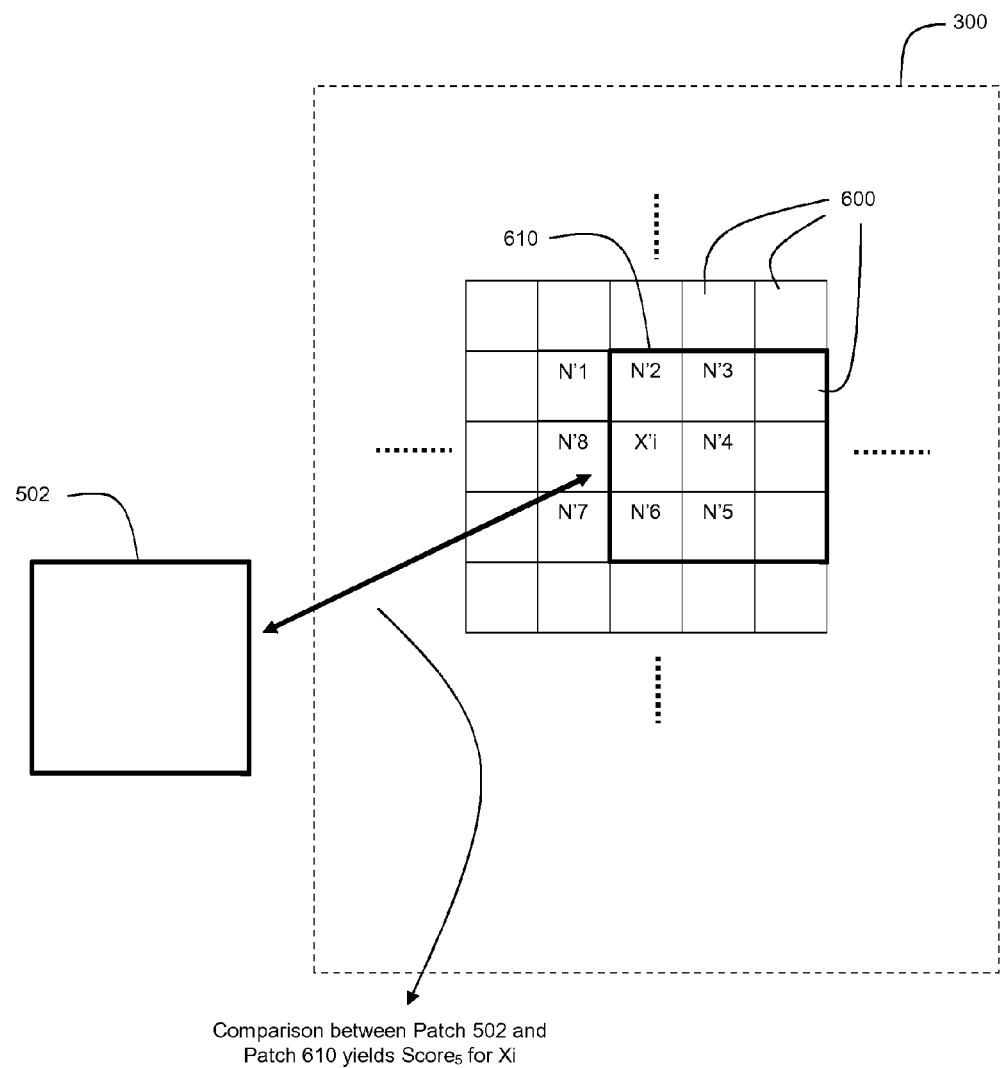
Figure 6F:
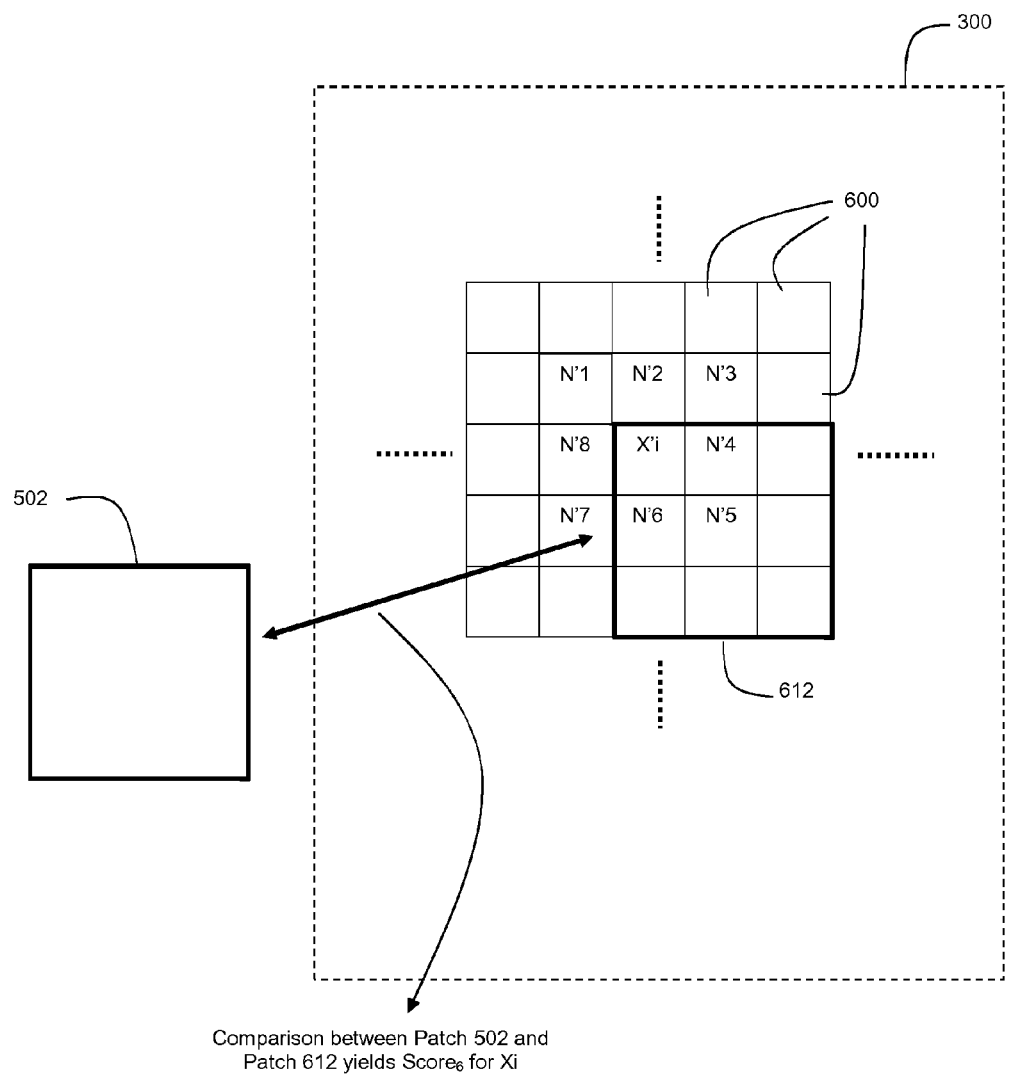
Figure 6G:
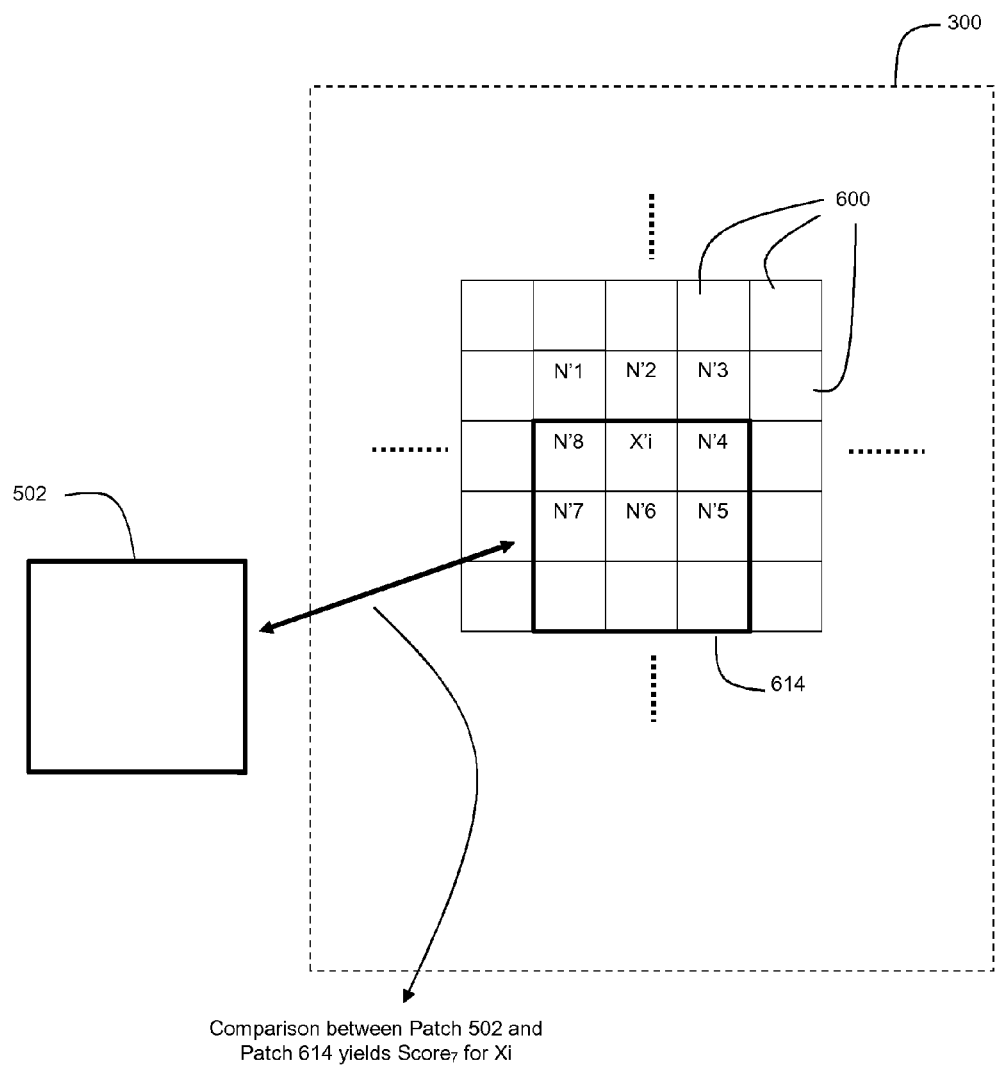
Figure 6H:
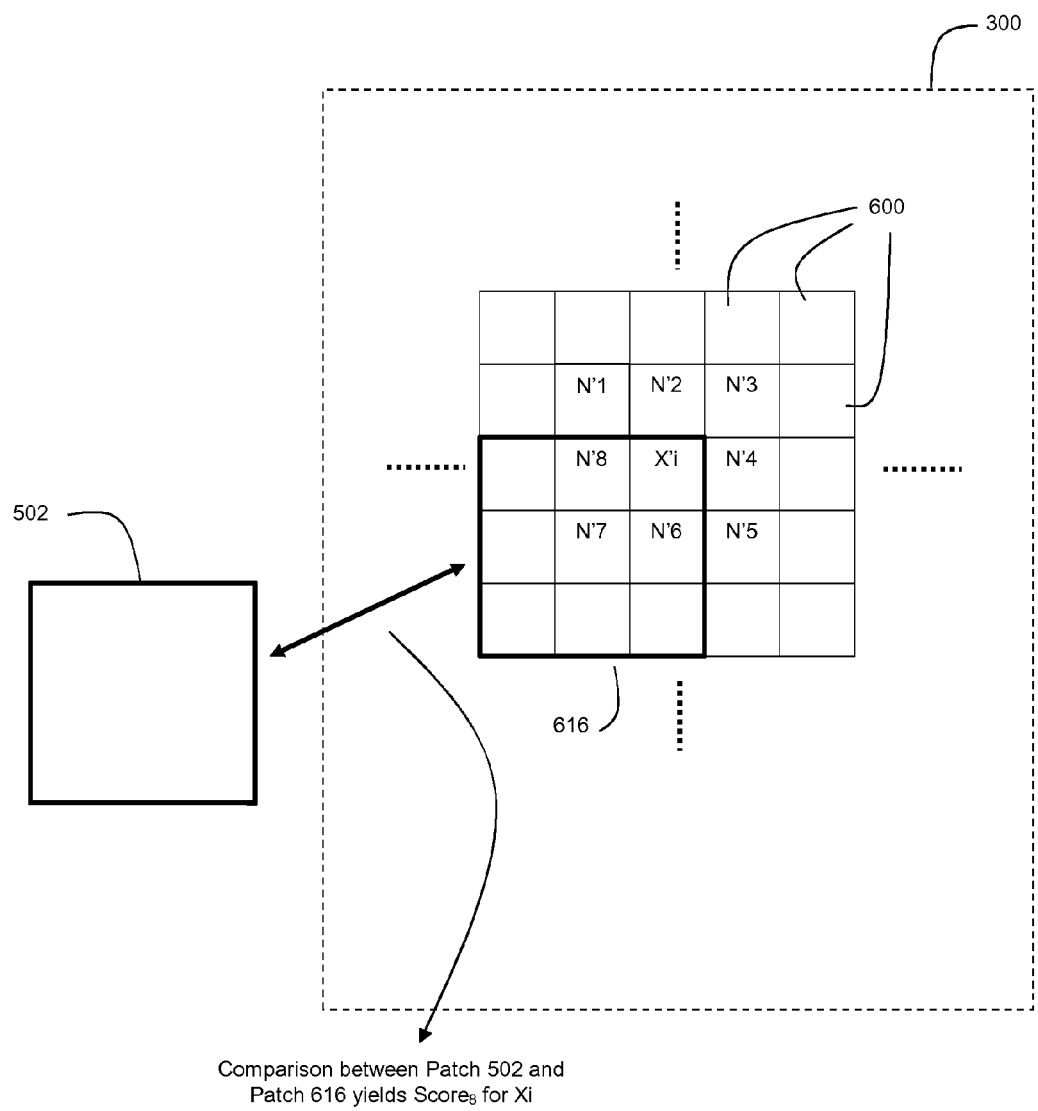
Figure 6I:
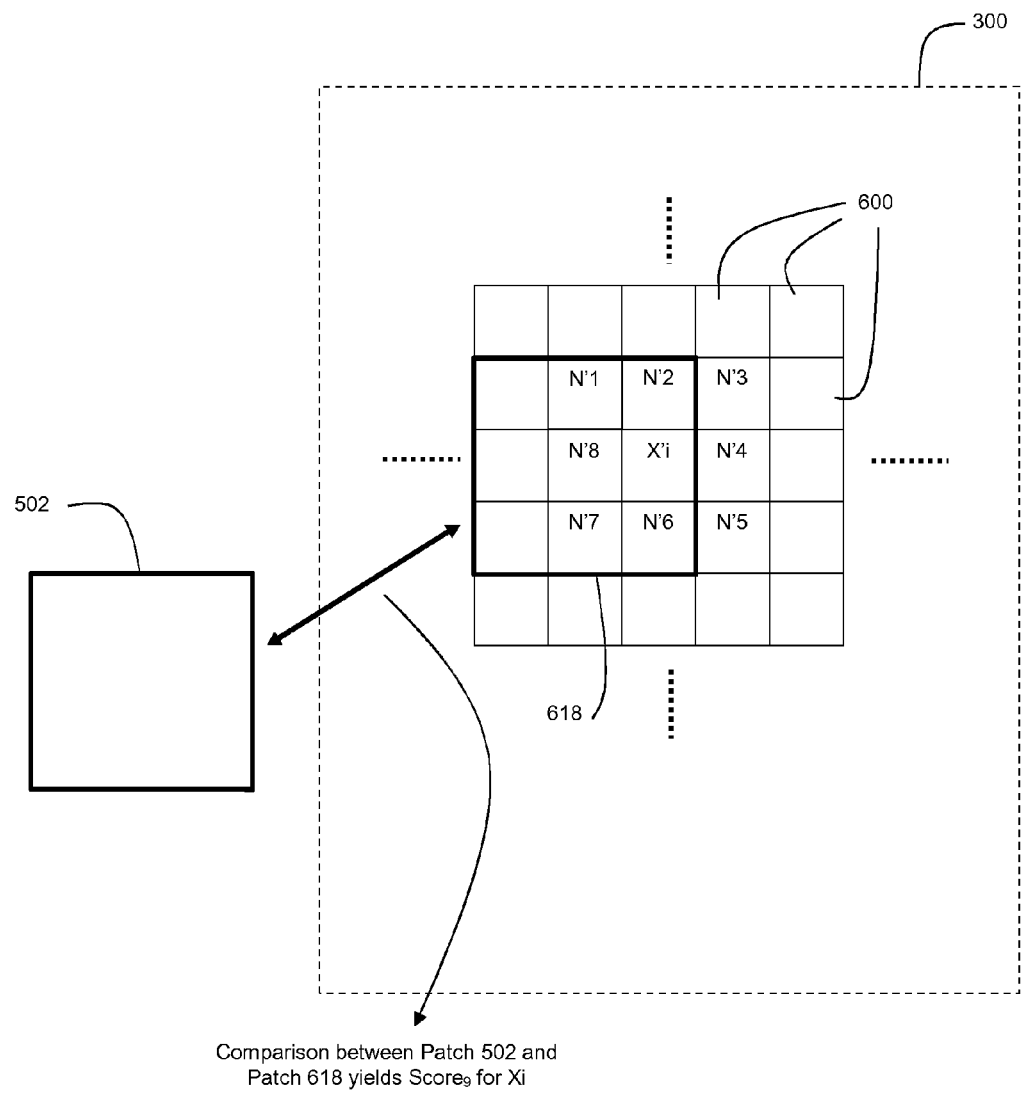

From step 414, the processor returns to steps 408 and 410 where in this instance it is patch 502 being compared with patch 604. The operation of step 410 in this $2^{nd}$ iteration thus yields a similarity score that is indicative of the similarity between patch 502 and patch 602. The processor continues to run through this loop until j=M. Thus, in a simple example where M=9:

The $3^{rd}$ iteration will result in a patch comparison between patch 502 and patch 606 shown in FIG. 6(c).
The $4^{th}$ iteration will result in a patch comparison between patch 502 and patch 608 shown in FIG. 6(d).
The $5^{th}$ iteration will result in a patch comparison between patch 502 and patch 610 shown in FIG. 6(e).
The $6^{th}$ iteration will result in a patch comparison between patch 502 and patch 612 shown in FIG. 6(f).
The $7^{th}$ iteration will result in a patch comparison between patch 502 and patch 614 shown in FIG. 6(g).
The $8^{th}$ iteration will result in a patch comparison between patch 502 and patch 616 shown in FIG. 6(h).
The $9^{th}$ iteration will result in a patch comparison between patch 502 and patch 618 shown in FIG. 6(i).

Thus, once j=M, a results data structure such as that shown by FIG. 7 will identify the various similarity scores computed with respect to patch 502 and the various patches 602-618.

Each score will be associated with an atlas MR image data point which corresponds to the atlas MR image patch for which that similarity score was computed (see column 700). Further of note is that due to the registration between the atlas MR image 300 and the atlas CT image 302, each score's corresponding atlas MR image data point can be mapped to a corresponding atlas CT image data point (see column 702). Thus, atlas CT image data point Y' ($X_i'$) is the atlas CT image data point in registration with atlas MR image data point $X_i'$. As can be seen from FIG. 7, each similarity score can thus be associated with a data point of the atlas CT image 302.

At step 416, the processor can compute a plurality of weight factors based on the similarity scores shown in the data structure of FIG. 7. The weights can be chosen proportionally to the similarity scores, i.e., an atlas point with a higher similarity score should be assigned a higher weight. If $S_j$ is used to denote similarity score for a point j of the atlas image, then an exemplary formula that can be used to compute the weight factors can be:

$$W_j = e^{\frac{S_j}{h}}$$

where h is a scaling parameter that can be chosen by the practitioner. If h is large (relative to the similarity scores), then all scores will be converted to roughly equal weights. If h is small (relative to the similarity scores), then the weights will be more spread out. If the similarity scores are computed using the LCC technique discussed above, a suitable value for h can be computed as:

$$h = \min_j (1-S_j)$$

It is also possible to directly use the similarity scores as the weighting factor, i.e., $W_j = S_j - \min_j S_j$, where the subtraction of the minimum value is to make sure that all weights are non-negative.

Step 416 thus results in the computation of a weight factor for a given similarity score (see column 800 of FIG. 8). Because each similarity score is associated with a corresponding atlas CT image data point (see column 702), this means that each weight factor in column 800 is also associated with a corresponding atlas CT image data point in column 702. The step 416 computation can take into consideration all of the similarity scores that were generated for point $X_i$. However, as explained in connection with FIG. 11, this need not be the case. If desired, a practitioner can configure step 416 such that the weight factors are computed from only a subset of the similarity scores.

At step 418, the processor computes a derived CT value for point $X_i$ based on the computed weight factors and the corresponding atlas CT image data points that are associated with the computed weight factors (see FIG. 9). An example of a weighted combination function to compute a derived CT data point at step 418 is:

$$Z(X_i) = \frac{1}{\sum_{j=1}^{M} W_j} \sum_{j=1}^{M} W_j Y'(X_j')$$

where $Z(X_i)$ is the derived CT value for point $X_i$, where $Y'(X_j')$ are the corresponding atlas CT values exemplified by FIGS. 7 and 8, and where $W_j$ is the weight for each atlas point. Thus, step 418, operates to compute a derived CT value for $X_i$, which can be labeled as $Z(X_i)$.

At step 420, the processor checks whether i equals N. N is a parameter chosen by a practitioner to define how many points of the patient MR image are to be translated to a derived CT image data point. N can be chosen such that it includes all data points of the patient MR image. However, this need not be the case. For example, a practitioner may desire to convert only a smaller region of the patient image (such as a region surrounding a particular organ). In such a case, N can be the number of points in this selected region of interest. If i does not yet equal N, the process flow proceeds to step 422.

At step 422, the value for i is incremented to go the next data point of the patient MR image ($X_{i+1}$), and the process flow returns to step 404. From step 404, the patch comparison process is repeated for a new patient MR image patch (this time around $X_{i+1}$), and the process flow proceeds to compute a derived CT value for $X_{i+1}$, which can be labeled as $Z(X_{i+1})$. After N has been reached, the process flow will have operated to generate the derived CT image from the patient MR image. The derived CT image will comprise the computed derived CT values for points $X_i$ through $X_N$ ($Z(X_i)$ through $Z(X_N)$).

Medical personnel can then use this derived CT image to augment the patient MR image. For example, the derived CT image can be displayed on a screen to illustrate aspects of a region of interest for the patient that are not revealed by the patient MR image.

It should be understood that step 400 of FIG. 4 can be omitted if desired by a practitioner. If the patient MR image has not been registered with the atlas, this means that there will not be a priori knowledge for step 406 to identify a data point $X_i'$ of the atlas MR image 300 that is in registration with point $X_i$. Thus, if the patient MR image is not registered with the atlas, the patch comparisons can operate to compare the selected MR image patch for $X_i$ with all possible patches in the atlas MR image (i.e., where the atlas MR image patches encompass in the aggregate all possible patches within the atlas MR image). Such an arrangement would expand the amount of data generated by the process and consume more computational resources (likely leading to a longer latency with respect to how long it takes to compute the derived CT image from the patient MR image). However, this may be an acceptable tradeoff for a practitioner.

Furthermore, because patch comparison-based weighted combination as described herein mitigates image registration error effects, in situations where step 400 is implemented, practitioners are free to choose an image registration technique using considerations where accuracy is not necessarily the critical factor. For example, to gain speed, a fast image registration technique can be used at step 400 even if it is likely to generate more registration error than a slower registration technique. Linear registration is typically much faster than non-linear registration. Linear registration deals only with global position, orientation, and size differences between two images, while non-linear registration is generally more accurate to also recover local anatomical shape differences (e.g., registering an image of a thin patient to an image of an overweight patient). For online or interventional applications, faster registration is typically needed (i.e., situations where a derived image needs to be computed shortly after the patient image is acquired). In such situations, the ability of exemplary embodiments to accommodate registration error is believed to be very advantageous because use in combination with less accurate registration techniques is enhanced.

Figure 10A:
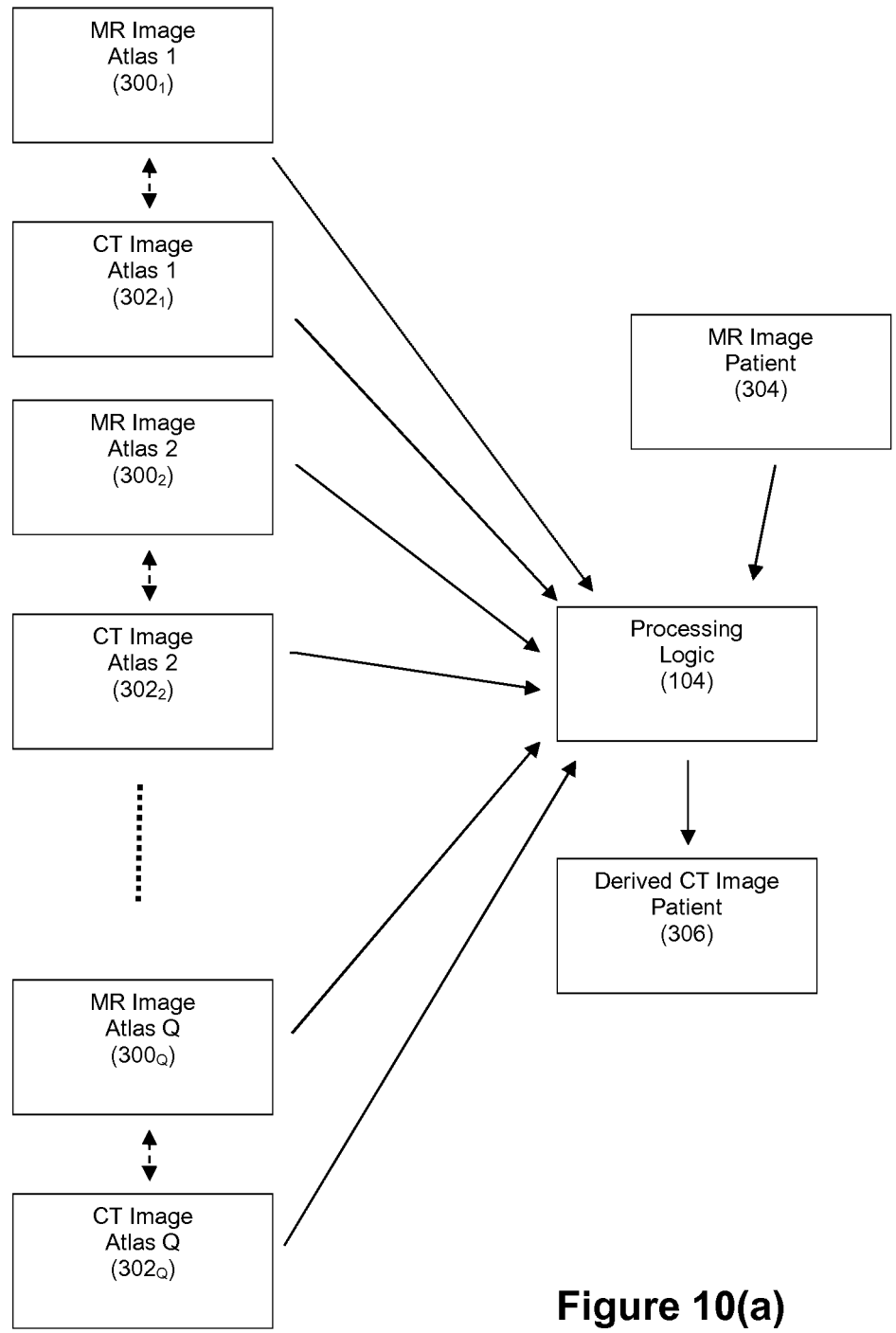
FIG. 10(a) depicts an exemplary embodiment where multiple atlas MR-CT image pairs are used to derive the CT image from the patient MR image.

Also, the example of FIGS. 3 and 4 illustrate a simple case where a single atlas MR image-atlas CT image pair is used to facilitate the CT data derivation for the patient MR image. In another exemplary embodiment, multiple atlas MR-CT pairs can be used to derive the CT data from the patient MR image. An example of such an embodiment is shown by FIG. 10(a). In FIG. 10(a), multiple pairs of co-registered atlas MR images 300i and atlas CT images 302i are employed. In this embodiment, the processing logic 104 can be configured such that steps 406-414 operate to compare each patient MR image patch with the desired set of patches for each atlas MR image 300i. This means that the resultant similarity scores will reflect the multiple atlas patches as shown by FIG. 10(b) where there are M similarity scores with respect to each atlas MR image. By taking into consideration a larger number of atlases, it is believed that the accuracy of the resultant CT data derivation can be further enhanced.

FIG. 11 depicts an example where only a subset of the similarity scores are used to compute the weight factors. This limitation may be desirable in instances where a large number of similarity scores with respect to a given point $X_i$ may be present (see for example the FIG. 10(b) embodiment). For example, the processor can be configured to rank the similarity scores (e.g., where similarity scores indicative of higher similarity are ranked higher than similarity scores indicative of lower similarity). The processor can then select the top k similarity scores, where the weight factors are computed from these top k similarity scores (see FIG. 11).

Figure 12:
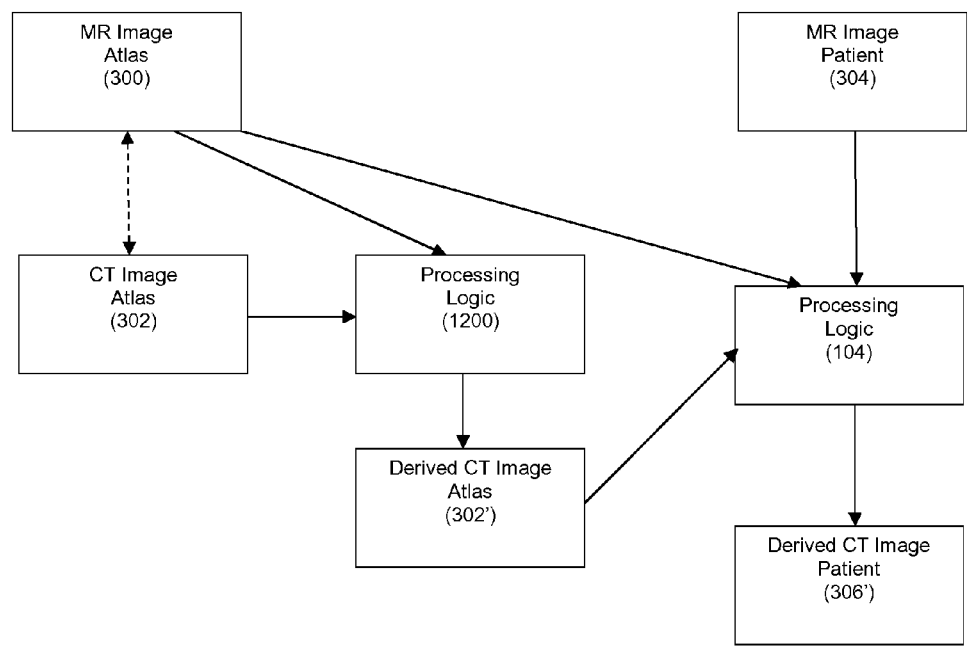
FIG. 12 depicts an exemplary embodiment where a patch comparison-weighted combination technique is used to create a derived atlas CT image in registration with the atlas MR image, and where the derived atlas CT image is used to derive the patient CT image.

Patch comparison-based weighted combination can also be applied to the atlas images to mitigate the effects of registration error as between an atlas MR image 300 and an atlas CT image, as shown by FIG. 12. In the example of FIG. 12, the processor executes processing logic 1200 to generate a derived atlas CT image 302' from the atlas MR image 300 and atlas CT image 302. Then, in turn, the derived patient CT image can be computed from the patient MR image using the atlas MR image 300 and the derived atlas CT image 306'. It should be readily understood that this arrangement can also be extended to the multi-atlas embodiment of FIG. 10(a).

Figure 13:
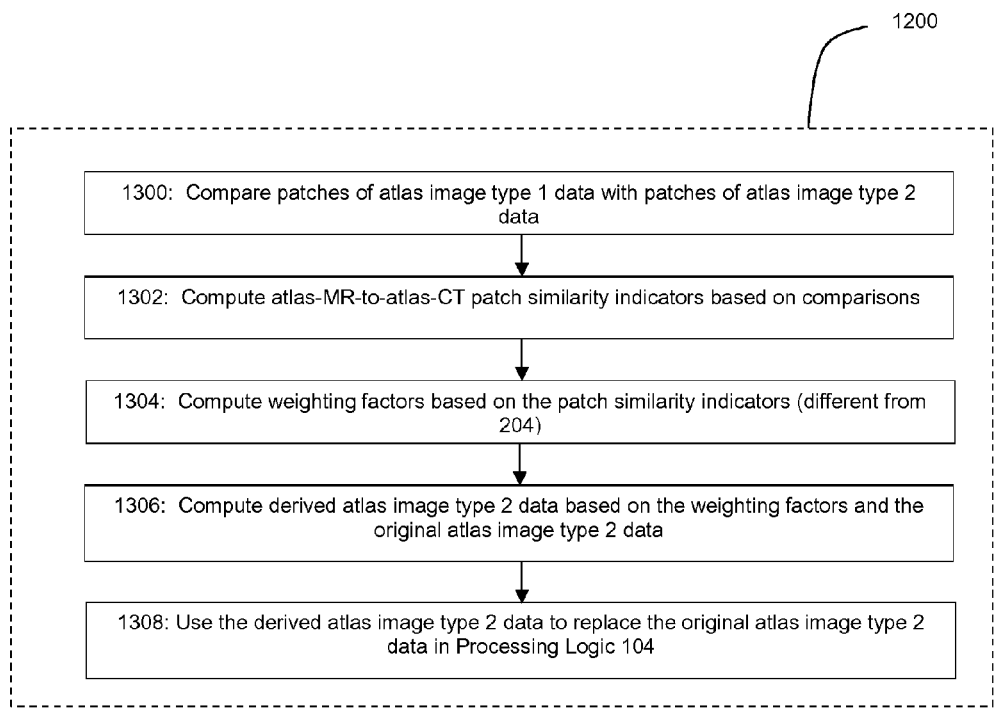
FIG. 13 depict an exemplary process flow for execution to implement the embodiment of FIG. 12.

FIG. 13 describes an exemplary general process flow for processing logic 1200. At step 1300, the processor compares patches of the type 1 atlas image with patches of the type 2 atlas image. At step 1302, the processor computes similarity indicators between the type 1 atlas patches and the type 2 atlas patches. One technique to compare patches or images from different image types/modalities is to use the mutual information (MI) metric (see Pluim, "*Mutual-information-based registration of medical images: a survey*", IEEE Trans. Med. Imag., 22(8): 986-1004, 2003, the entire disclosure of which is incorporated by reference. For two patches of two images A and B, MI can be defined as:

$$MI(A,B)=H(B)-H(B|A)$$

where H(B) is the Shannon entropy of patch/image B, computed on the probability distribution of its intensity values. H(B|A) denotes the conditional entropy, which is based on the conditional probabilities p(b|a), the chance of intensity value b in patch B given that the corresponding voxel in A has intensity value a. Then, at step 1304, the processor computes the weight factors from the similarity indicators as described in connection with step 416. Then, at step 1306, the processor computes the derived type 2 atlas image from the weight factors and the original type 2 atlas image data (see step 418). This derived type 2 atlas image is then used in place of the original type 2 atlas image by processing logic 104 (step 1308).

Figure 14:
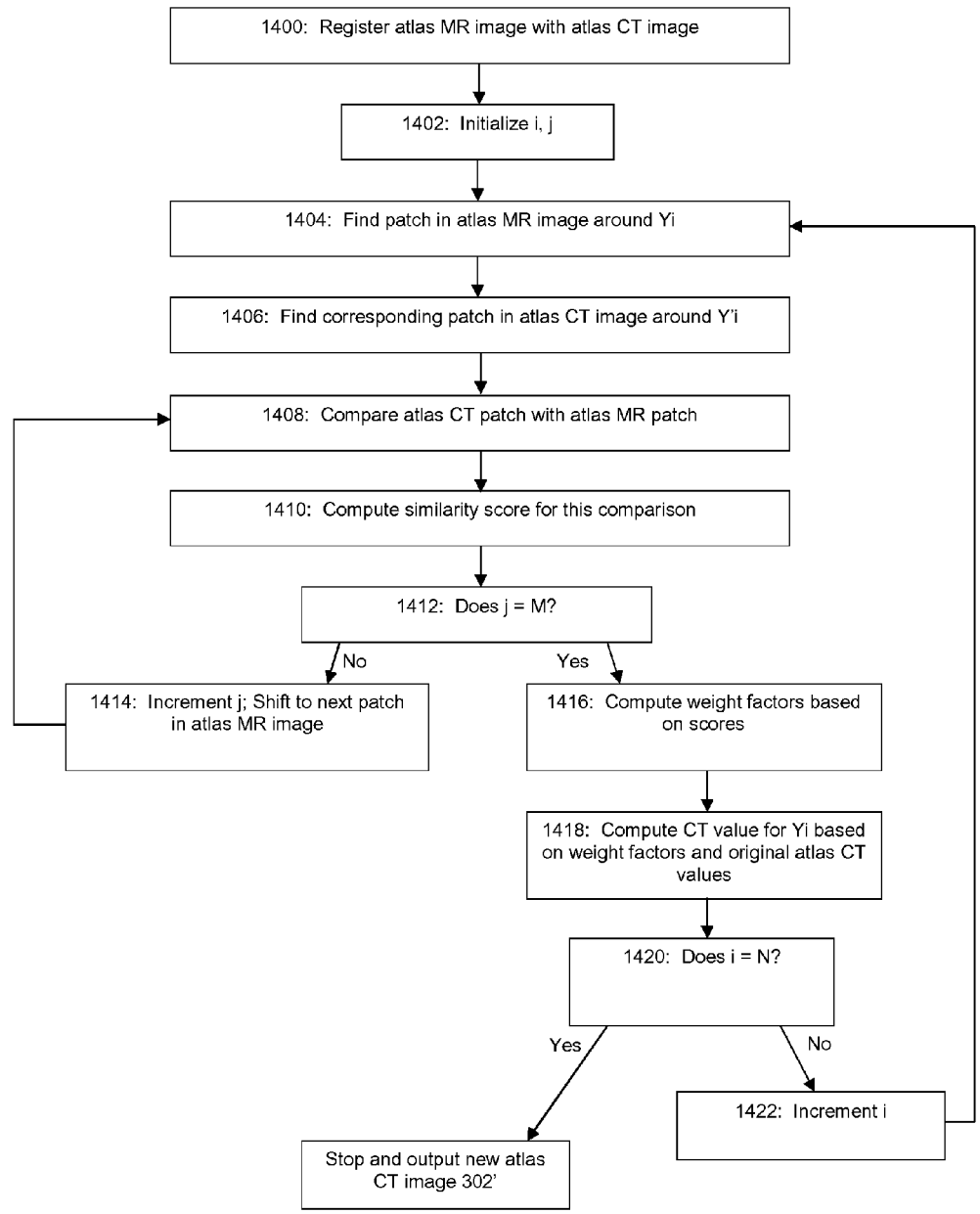
FIG. 14 depicts an exemplary embodiment for the process flow of FIG. 13 with respect to generating the derived atlas CT image.
Figure 15:
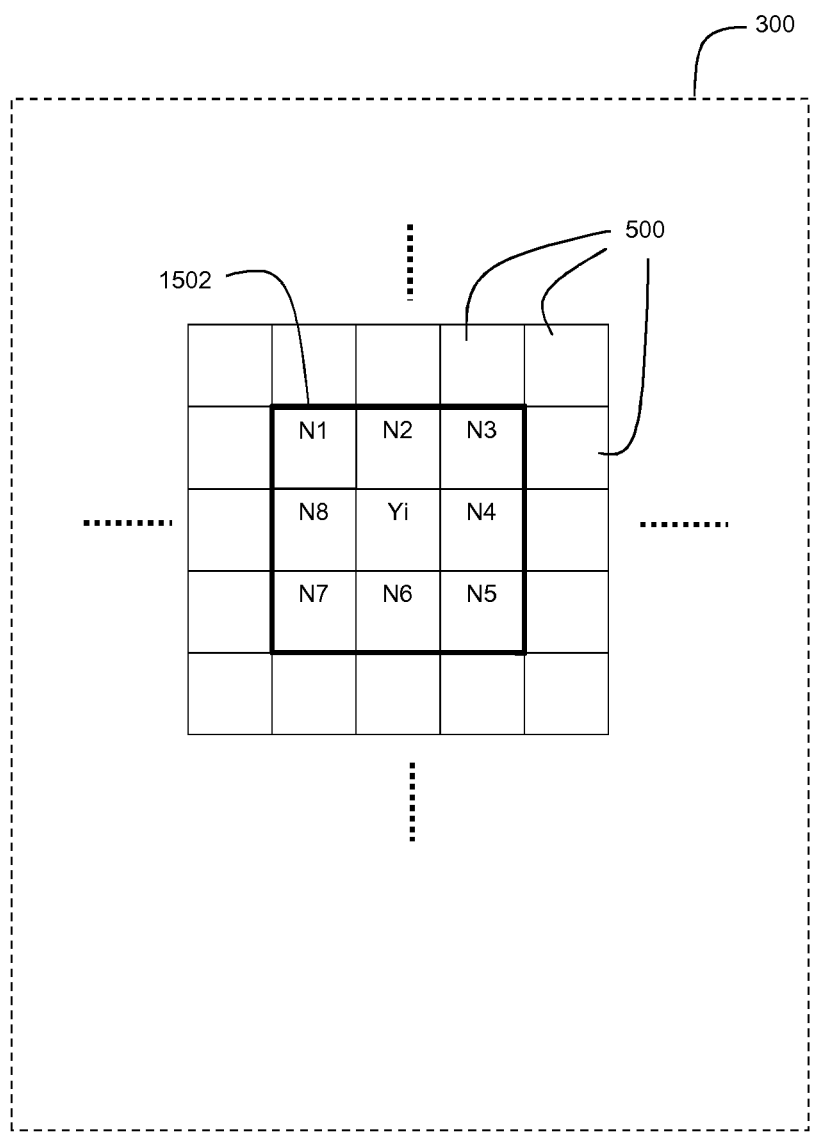
FIG. 15 depicts an exemplary patch for an atlas MR image.
Figure 16:
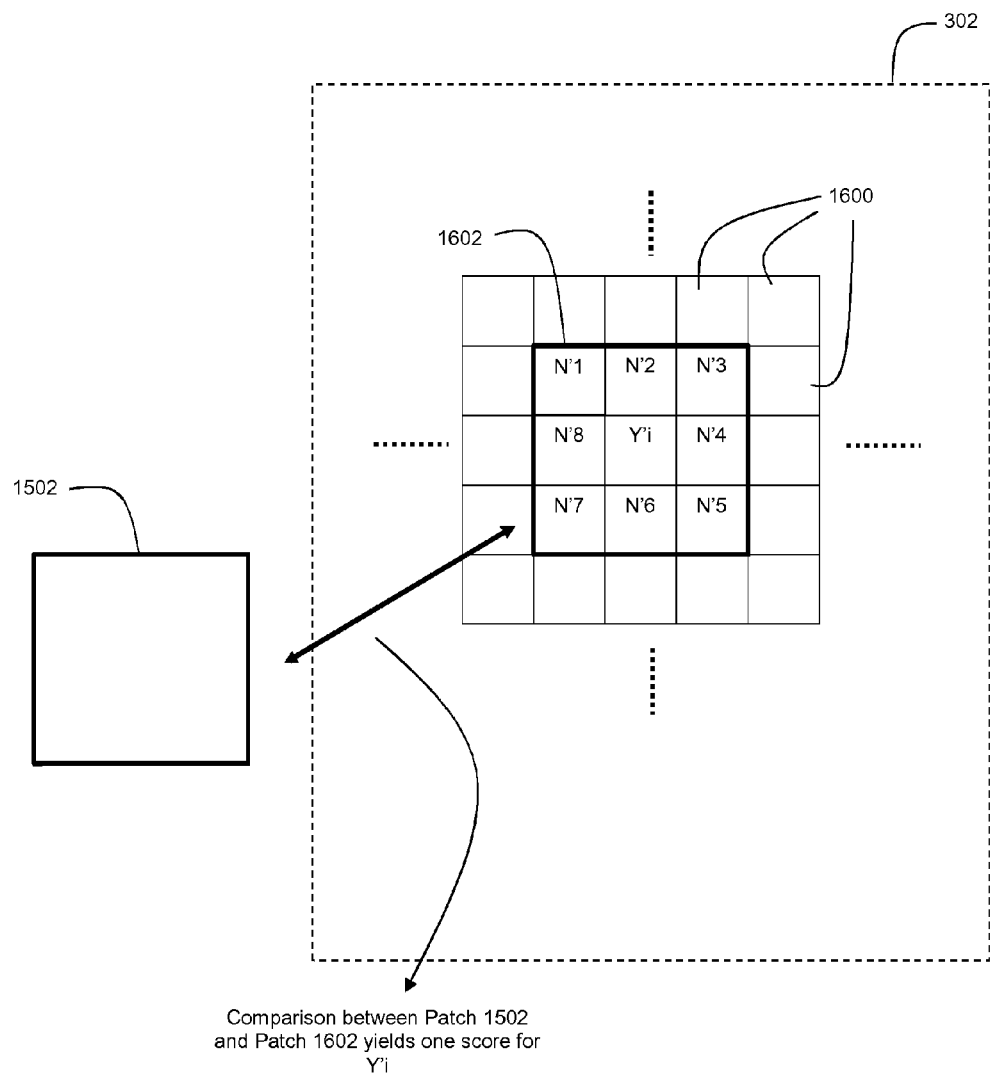
FIG. 16 depicts an example of how the exemplary atlas MR image patch from FIG. 15 can be compared with a patch of the atlas CT image as part of the FIG. 14 process flow.

FIG. 14 provides an example of this process flow where a derived atlas CT image is generated from an atlas MR image-atlas CT image pair. At step 1400, the atlas MR image is registered with the original atlas CT image. Once again, a practitioner is free to choose a registration technique that balances speed and accuracy in a desirable fashion. Step 1402 then proceeds as described above with respect to step 402. Step 1404 is similar to step 404, except the patch is selected for the atlas MR image around point $X_i$ (in this embodiment, $X_i$ will be used to refer to a point in the atlas MR image 300). FIG. 15 depicts an exemplary atlas MR image patch 1502 that can be selected at step 1404. Step 1406 is similar to step 406, except the patch is selected for the original atlas CT image around point $Y_i'$. FIG. 16 depicts an exemplary atlas CT image patch 1602 that can be selected from original atlas CT image data points 1600 at step 1406.

At step 1408, a patch comparison is performed to compute a similarity score (step 1410). Because this is a comparison between MR data and CT data, a different comparison technique is used than was used for steps 408 and 410. The comparison techniques based on MI can be used at step 1410 as described above. An additional cross-modality comparison metric that can be employed includes correlation ratio as described by Roche et al, "*The correlation ratio as a new similarity measure for multimodal image registration*", Proc. Of MICCAI '98, vol. 1496 of LNCS, pp. 1115-1124, 1998, the entire disclosure of which is incorporated herein by reference.

Steps 1412-1422 can then proceed in a fashion similar to that described for steps 412-422. The end result of the FIG. 14 process flow will be a set of derived atlas CT image data points for a derived atlas CT image 302' (Y").

Figure 17:
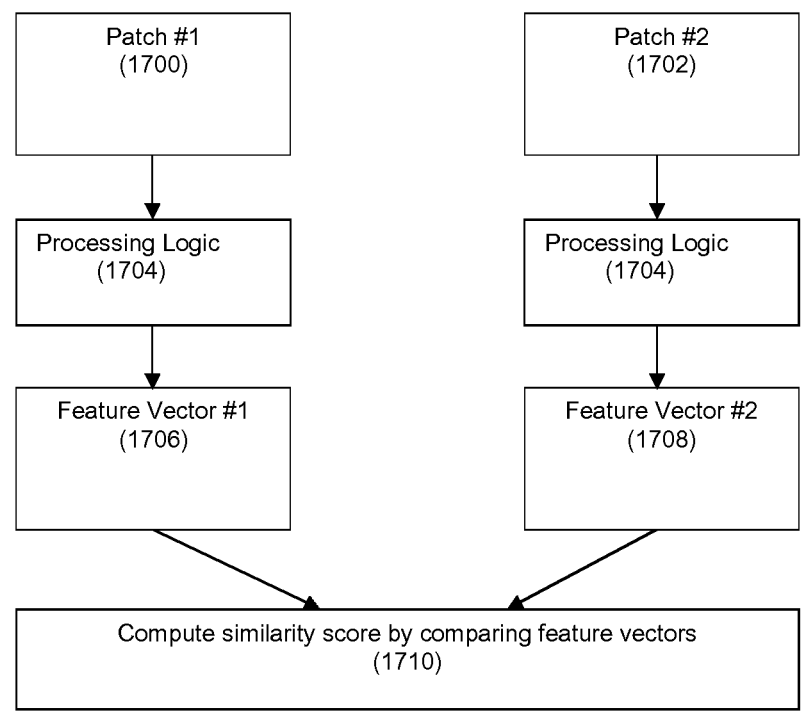
FIG. 17 depicts an exemplary patch comparison technique based on feature vectors of the patches to be compared.

FIG. 17 depicts a technique for patch comparison where patches are indirectly compared via feature vectors derived from each patch. Patches 1700 and 1702 can be pre-processed by processing logic 1704 to generate feature vectors 1706 and 1708 for patches 1700 and 1702 respectively. Examples of features that can be computed for patches include a mean, a variance, moments, or a random projection (e.g., projecting an N-by-N patch into an M-dimension vector using random projection). Then at step 1710, the similarity score can be computed based on vectors of these features. The FIG. 17 patch comparison embodiment can be advantageous because the dimensions of the feature vector for a patch can be much smaller than the original patch, which will contribute to improvements in computational and storage efficiency.

Figure 18:
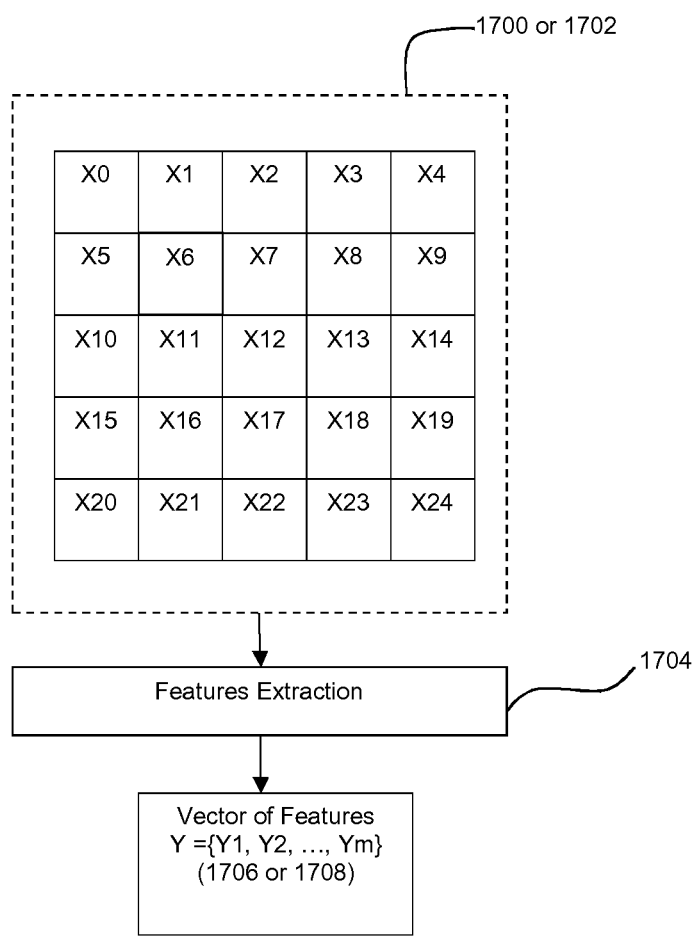
FIG. 18 depicts an exemplary arrangement for computing a feature vector with respect to a patch.

FIG. 18 depicts how a 25-point patch 1700 or 1702 can have feature extraction performed on it by processing logic 1704 to generate a feature vector 1706 or 1708. For example:

A mean feature can be calculated as:

$$\text{Mean: } \overline{X} = \frac{1}{N}\sum_{i=1}^{N} X_i$$

A variance feature can be calculated as:

$$\text{Variance: } \sigma_X^2 = \frac{1}{N}\sum_{i=1}^{N} (X_i - \overline{X})^2$$

A moments feature can be calculated as:

$$\text{Moments of order } k \ (k >= 1): m_X^k = \frac{1}{N}\sum_{i=1}^{N} X_i^k$$

A random projection feature can be calculated as:

Random Projection: Y=P X: P is a random M-by-N matrix, X is the original patch with dimension N, Y is a vector of smaller dimension M (M<<N). Since M<<N, comparing of Y is quicker than directly comparing X.

The feature vector 1706/1708 can then use any combination of these or other features $Y_i$ (e.g., where $Y_1$ is the mean, $Y_2$ is the variance, etc.).

While the present invention has been described above in relation to its preferred embodiments, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. A method of converting a first image of a first modality type to a second image of a second modality type based on a first reference image of the first modality type and a second reference image of the second modality type, wherein the first modality type and the second modality type are different, the method comprising:
    selecting a first set of image data points in the first image, wherein the first set of image data points is associated with a first image data point of the first image;
    selecting a plurality of sets of image data points in the first reference image, wherein each set of the selected image data points in the first reference image is associated with a reference image data point of the first reference image, and wherein each set of the selected image data points in the first reference image is associated with a different reference image data point of the first reference image;
    comparing the first set of image data points selected in the first image and each of the plurality of sets of selected image data points in the first reference image to generate a plurality of similarity indicators respectively indicative of similarities between the first image data point and corresponding reference image data points;
    computing a plurality of weight factors associated with a plurality of reference image data points in the second reference image based on the similarity indicators;
    computing a second image data point corresponding to the first image data point as a weighted combination of the plurality of reference image data points in the second reference image that are associated with the computed weight factors, the weighted combination being in accordance with the computed weight factors; and
    generating the second image including a plurality of second image data points by repeatedly computing individual second image data points of the second image based on a plurality of different first image data points in the first image.

2. The method of claim 1, wherein the first modality type is magnetic resonance (MR), and wherein the second modality type is computed tomography (CT).

3. The method of claim 2, wherein the first reference image comprises an atlas MR image, and the second reference image comprises an atlas CT image.

4. The method of claim 1, wherein the reference image data points in the second reference image associated with the weight factors are in registration with the reference image data points in the first reference image.

5. The method of claim 1, further comprising registering the first image with the first reference image.

6. The method of claim 5, wherein the selected plurality of image data points in the first reference image are proximate to and associated with the first reference image data point that is in registration with the first image data point.

7. The method of claim 6, wherein the first set of image data points in the first image includes the first image data point and a plurality of additional image data points that are proximate to the first image data point.

8. The method of claim 7, wherein the additional image data points are centered around the first image data point.

9. The method of claim 1, wherein the second reference image comprises a derived atlas CT image.

10. The method of claim 9, further comprising generating the derived atlas CT image, including:
    comparing a set of image data points of the first reference image and a plurality sets of image data points of an atlas CT image to generate a plurality of atlas image similarity indicators, the set of image data points of the first reference image being associated with an image data point of the first reference image;
    computing a plurality of atlas image weight factors based on the atlas image similarity indicators, the computed atlas image weight factors being associated with a plurality of image data points in the atlas CT image;
    computing a derived atlas CT image data point as a weighted combination of the image data points that are associated with the computed atlas image weight factors, the weighted combination being in accordance with the computed atlas image weight factors; and
    generating the derived atlas CT image including a plurality of derived atlas CT image data points by repeatedly computing individual derived atlas CT image data points based on a plurality of different image data points of the first reference image.

11. The method of claim 1, wherein comparing the first set of image data points selected in the first image and each of the plurality sets of image data points selected in the first reference image comprises:
    computing a first feature vector for the first set of image data points selected in the first image;
    computing a feature vector for each of the plurality sets of image data points selected in the first reference image; and
    comparing the first feature vector with each of the computed feature vectors for the plurality sets of image data points selected in the first reference image to generate the similarity indicators.

12. The method of claim 1, wherein computing the weight factors comprises:
    selecting a subset of the generated similarity indicators; and
    computing the weight factors based on the selected subset of similarity indicators.

13. The method of claim 12, wherein selecting the subset of the generated similarity indicators comprises:
    ranking the generated similarity indicators such that similarity indicators indicative of a higher degree of similarity are ranked higher than similarity indicators indicative of a lower degree of similarity; and
    selecting the subset of the similarity indicators to include a defined quantity of the similarity indicators that are ranked higher than the rest of the similarity indicators.

14. The method of claim 1, wherein converting the first image of the first modality type to the second image of the second modality type is based on a plurality of reference images of the first modality type and a plurality of reference images of the second modality type, wherein the reference images of the first modality type comprise a plurality of atlas MR images, the reference images of the second modality type comprise a plurality of atlas CT images, each atlas MR image registers to a corresponding atlas CT image, and wherein comparing the first set of image data points and each of the plurality sets of image data points includes performing a plurality of comparisons between the first set of image data points and a plurality sets of atlas MR image data points for each of the atlas MR images to generate a plurality of similarity indicators, the similarity indicators being indicative of similarities between the first image data point and a plurality of image data points for the plurality of atlas MR images, and wherein the computed weight factors are associated with a plurality of atlas CT image data points for the plurality of atlas CT images.

15. The method of claim 1, wherein comparing the first set of image date points selected in the first image and each of the plurality sets of image data points selected in the first reference image comprises comparing the first set of image data points with the plurality of sets of image data points using a local correlation coefficient comparison technique.

16. The method of claim 1, wherein comparing the first set of image date points selected in the first image and each of the plurality sets of image data points selected in the first reference image comprises comparing the first set of image data points with the plurality of sets of image data points using a random projection technique.

17. The method of claim 1, further comprising displaying the generated second image.

18. An apparatus for converting a first image of a first modality type to a second image of a second modality type based on at a first reference image of the first modality type and a second reference image of the second modality type, wherein the first modality type and the second modality type are different, the apparatus comprising a processor configured to perform the following:
  select a first set of image data points in the first image, wherein the first set of image data points is associated with a first image data point of the first image,
  select a plurality of sets of image data points in the first reference image, wherein each set of the selected image data points selected in the first reference image is associated with a reference image data point of the first reference image, and wherein each set of the selected image data points in the first reference image is associated with a different reference image data point of the first reference image;
  compare the first set of image data points selected in the first image and each of the plurality of sets of selected image data points in the first reference image to generate a plurality of similarity indicators respectively indicative of similarities between the first image data point and corresponding reference image data points;
  compute a plurality of weight factors associated with a plurality of reference image data points in the second reference image based on the similarity indicators;
  compute a second image data point corresponding to the first image data point as a weighted combination of the plurality of reference image data points in the second reference image that are associated with the computed weight factors, the weighted combination being in accordance with the computed weight factors; and
  generate the second image including a plurality of second image data points by repeatedly computing individual second image data points of the second image based on a plurality of different first image data points in the first image.

19. The apparatus of claim 18, wherein the first modality type is magnetic resonance (MR), and wherein the second modality type is computed tomography (CT).

20. The apparatus of claim 19, wherein the first reference image comprises an atlas MR image, and the second reference image comprises an atlas CT image.

21. The apparatus of claim 18, wherein the reference image data points in the second reference image associated with the weight factors are in registration with the reference image data points in the first reference image.

22. The apparatus of claim 18, wherein the processor is further configured to register the first image with the first reference image.

23. The apparatus of claim 22, wherein the selected plurality of image data points in the first reference image are proximate to and associated with the first reference image data point that is in registration with the first image data point.

24. The apparatus of claim 23, wherein the first set of image data points in the first image includes the first image data point and a plurality of additional image data points that are proximate to the first image data point.

25. The apparatus of claim 24, wherein the additional image data points are centered around the first image data point.

26. The apparatus of claim 18, wherein the second reference image comprises a derived atlas CT image.

27. The apparatus of claim 26, wherein the processor is further configured to generate the derived atlas CT image by:
  comparing a set of image data points of the first reference image and a plurality sets of image data points of an atlas CT image to generate a plurality of atlas image similarity indicators, the set of image data points of the first reference image being associated with an image data point of the first reference image;
  computing a plurality of atlas image weight factors based on the atlas image similarity indicators, the computed atlas image weight factors being associated with a plurality of image data points in the atlas CT image;
  computing a derived atlas CT image data point as a weighted combination of the image data points that are associated with the computed atlas image weight factors, the weighted combination being in accordance with the computed atlas image weight factors; and
  generating the derived atlas CT image including a plurality of derived atlas CT image data points by repeatedly computing individual derived atlas CT image data points based on a plurality of different image data points of the first reference image.

28. The apparatus of claim 18, wherein the processor is configured to compare the first set of image data points selected in the first image and each of the plurality sets of image data points selected in the first reference image by:
  computing a first feature vector for the first set of image data points selected in the first image;
  computing a feature vector for each of the plurality sets of image data points selected in the first reference image; and
  comparing the first feature vector with each of the computed feature vectors for the plurality sets of image data points selected in the first reference image to generate the similarity indicators.

29. The apparatus of claim 18, wherein the processor is further configured to compute the weight factors by:
  selecting a subset of the generated similarity indicators; and
  computing the weight factors based on the selected subset of similarity indicators.

30. The apparatus of claim 29, wherein the processor is further configured to select the subset of the generated similarity indicators by:
  ranking the generated similarity indicators such that similarity indicators indicative of a higher degree of similarity are ranked higher than similarity indicators indicative of a lower degree of similarity; and
  selecting the subset of the similarity indicators to include a defined quantity of the similarity indicators that are ranked higher than the rest of the similarity indicators.

31. The apparatus of claim 18, wherein the processor is configured to convert the first image of the first modality type to the second image of the second modality type based on a plurality of reference images of the first modality type and a plurality of reference images of the second modality type, wherein the reference images of the first modality type comprise a plurality of atlas MR images, the reference images of the second modality type comprise a plurality of atlas CT images, each atlas MR image registers to a corresponding atlas CT image, and wherein the processor is further configured to compare the first set of image data points and each of the plurality sets of image data points by performing a plurality of comparisons between the first set of image data points and a plurality sets of atlas MR image data points for each of the atlas MR images to generate a plurality of similarity indicators, the similarity indicators being indicative of similarities between the first image data point and a plurality of image data points for the plurality of atlas MR images, and wherein the computed weight factors are associated with a plurality of atlas CT image data points for plurality of atlas CT images.

32. A non-transitory computer readable medium storing computer instructions, wherein the computer instructions, when executed by a processor, cause the processor to perform operations for converting a first image of a first modality type to a second image of a second modality type based on a first reference image of the first modality type and a second reference image of the second modality type, wherein the first modality type and the second modality type are different, the operations comprising:
  selecting a first set of image data points in the first image, wherein the first set of image data points is associated with a first image data point of the first image;
  selecting a plurality of sets of image data points in the first reference image, wherein each set of the selected image data points in the first reference image is associated with a reference image data point of the first reference image, and wherein each set of the selected image data points in the first reference image is associated with a different reference image data point of the first reference image;
  comparing the first set of image data points selected in the first image and each of the plurality of sets of selected image data points in the first reference image to generate a plurality of similarity indicators respectively indicative of similarities between the first image data point and corresponding reference image data points;
  computing a plurality of weight factors associated with a plurality of reference image data points in the second reference image based on the similarity indicators;
  computing a second image data point corresponding to the first image data point as a weighted combination of the plurality of reference image data points in the second reference image that are associated with the computed weight factors, the weighted combination being in accordance with the computed weight factors; and
  generating the second image including a plurality of second image data points by repeatedly computing individual second image data points of the second image based on a plurality of different first image data points in the first image.

* * * * *